(12) United States Patent
 Xiong

(10) Patent No.: US 8,976,794 B2
(45) Date of Patent: Mar. 10, 2015

(54) METHOD TO CARRY FCOE FRAMES OVER A TRILL BASED NETWORK

(71) Applicant: Futurewei Technologies, Inc., Plano, TX (US)

(72) Inventor: Yijun Xiong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 112 days.

(21) Appl. No.: 13/707,294

(22) Filed: Dec. 6, 2012

(65) Prior Publication Data

US 2013/0148663 A1 Jun. 13, 2013

Related U.S. Application Data

(60) Provisional application No. 61/567,900, filed on Dec. 7, 2011.

(51) Int. Cl.

| | | |
|---|---|---|
| H04L 12/56 | (2006.01) | |
| H04J 14/00 | (2006.01) | |
| H04Q 11/00 | (2006.01) | |
| H04L 12/28 | (2006.01) | |
| G06F 13/36 | (2006.01) | |
| H04L 12/54 | (2013.01) | |
| H04B 10/20 | (2006.01) | |
| G06F 15/173 | (2006.01) | |
| G06F 15/16 | (2006.01) | |

(Continued)

(52) U.S. Cl.
CPC .......... *H04L 45/745* (2013.01); *H04L 12/4625* (2013.01); *H04L 12/4633* (2013.01); *H04L 12/4641* (2013.01)

USPC ...... 370/392; 370/428; 370/401; 370/395.53; 370/409; 710/311; 398/58; 709/238; 709/249

(58) Field of Classification Search
CPC . H04L 49/351; H04L 49/357; H04L 12/4625; H04L 12/4633; H04L 12/4641; H04L 45/745; H04L 12/46; H04L 49/70; H04L 45/586; H04L 45/741; H04L 61/6045
USPC .................... 370/392, 401, 395.53, 409, 428; 710/311; 398/58; 709/238, 249
See application file for complete search history.

(56) References Cited

U.S. PATENT DOCUMENTS 8,625,616 B2 * 1/2014 Vobbilisetty et al. ......... 370/401
2009/0296726 A1 12/2009 Snively et al.

(Continued)

OTHER PUBLICATIONS

FCoE Security Recommendations; T11/08-588v0; Oct. 22, 2008.*

(Continued)

*Primary Examiner* — Alpus H Hsu
*Assistant Examiner* — Elton Williams
(74) *Attorney, Agent, or Firm* — Conley Rose, P.C.; Grant Rodolph; William H. Dietrich

(57) ABSTRACT

An apparatus for forwarding an Fiber Channel over Ethernet (FCoE) data frame into an Ethernet network comprising a processor configured to receive a data frame on a input port, obtain a first destination address and a virtual local area network identifier (VID), determine whether the first destination address and the VID matches an entry within a forwarding table, construct a key when the first destination address and VID matches the entry and the data frame is a FCoE frame, and forward the data frame as an outgoing data frame via an output port when the key matches a rule that permits forwarding the data frame.

19 Claims, 12 Drawing Sheets

(51) Int. Cl.
*H04L 12/741* (2013.01)
*H04L 12/46* (2006.01)

(56) References Cited

U.S. PATENT DOCUMENTS

| | | | |
|---|---|---|---|
| 2011/0064086 A1 | 3/2011 | Xiong et al. | |
| 2011/0299413 A1* | 12/2011 | Chatwani et al. | 370/252 |
| 2012/0063316 A1* | 3/2012 | Ghanwani et al. | 370/235 |
| 2012/0163395 A1* | 6/2012 | Shukla et al. | 370/409 |
| 2012/0177045 A1* | 7/2012 | Berman | 370/392 |
| 2012/0275301 A1 | 11/2012 | Xiong | |
| 2012/0275339 A1 | 11/2012 | Xiong et al. | |
| 2012/0275467 A1 | 11/2012 | Xiong et al. | |
| 2012/0275787 A1 | 11/2012 | Xiong et al. | |

OTHER PUBLICATIONS

Fibre Channel, Switch Fabric—5 (FC-SW-5). Rev 8.0, INCITS xxx-xxxx, T11/Project 1822-D/REV 8.5, Jun. 3, 2009, 333 pages.*
Eastlake 3rd, D., et al. "RBridges: Adjacency" draft-ietf-trill-adj-06.txt, Apr. 11, 2011, 33 pages.
Foreign Communication From a Counterpart Application, PCT Application PCT/US2012/068287, International Search Report dated Apr. 5, 2013, 5 pages.
Foreign Communication From a Counterpart Application, PCT Application PCT/US2012/068287, Written Opinion dated Apr. 5, 2013, 8 pages.
Desanti, C., et al., "VA_Ports: FDF / Controlling FCF Protocols," Cisco, T11/10-271v3, Oct. 2010, 35 pages.
"Draft Standard for Local and Metropolitan Area Networks—Virtual Bridged Local Area Networks—Amendment 9: Shortest Path Bridging," IEEE P802.1aq/D2.5, Jan. 6, 2010, 228 pages.
Perlman, R., et al., "Routing Bridges (RBridges) : Base Protocol Specification," RFC 6325, Jul. 2011, 99 pages.
Melman, David et al., "FCoE Over Trill," draft-mme-trill-01.txt, Sep. 11, 2011, 12 pages.
Desanti, Claudio, "FDF Routing," Cisco, T11/10-465v0, Oct. 2010, 34 pages.
"Fibre Channel, Backbone—5 (FC-BB-5), REV 2.00," Incits xxx-200x, T11/Project 1871-D/Rev 2.00, Jun. 4, 2009, 180 pages.
"Fibre Channel, Switch Fabric—5 (FC-SW-5), Rev 8.0," INCITS xxx-xxxx, T11/Project 1674-D/Rev 8.0, Nov. 22, 2066, 329 pages.

* cited by examiner

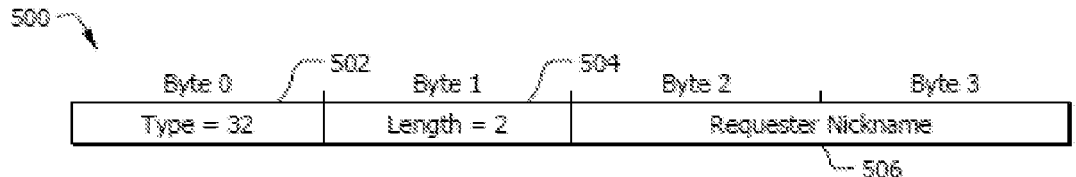

METHOD TO CARRY FCOE FRAMES OVER A TRILL BASED NETWORK

CROSS-REFERENCE TO RELATED APPLICATIONS

The present application claims priority to U.S. Provisional Patent Application No. 61/567,900 filed Dec. 7, 2011 by Yijun Xiong and entitled "Method to Carry Fibre Channel over Ethernet Frames Over a Transparent Interconnection of Lots of Links Based Network" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fiber Channel over Ethernet (FCoE) is a technology used for transporting Fiber Channel (FC) frames using Ethernet switches and connections, which is currently being standardized at the Technical Committee for Fiber Channel (T11) of the International Committee for Information Technology Standards (INCITS). FCoE technology enables users to establish a unified network infrastructure for data centers based on Ethernet. The capability to transport FC data on top of an Ethernet network alleviates the problem of maintaining a separate storage area network (SAN) and Ethernet network. FCoE integrates FC based networks with Ethernet based networks by mapping FC frames over Ethernet frames and transmitting the FC frames on Ethernet links. As a result, FCoE institutes a converged network that reduces the complexity, space, and cost necessary to maintain the data center and Ethernet network infrastructure.

Unfortunately, current FCoE technology fails to provide a seamless and complete integration between an FC/FCoE based networks and an Ethernet based networks. Through the use of special FCoE switches, such as Fiber Channel Forwarders (FCFs), current FCoE technology replaces the FC physical (FC-0) and FC coding (FC-1) layers of the FC architecture with the Ethernet physical and Media Access Control (MAC) layers of the Ethernet architecture without altering the FC framing (FC-2) layer and higher layers. As a result, FCoE switches are able to support forwarding both FCoE frames and regular Ethernet frames. However, to support both types of data frames, the FCoE switches require one data plane and one control plane to manage the regular Ethernet frames and another data plane and control plane to manage FCoE frames.

Furthermore, FCoE networks still employ the Fabric Shortest Path First (FSPF) routing protocol used in FC networks to populate forwarding tables for the FCoE switches. Thus, current FCoE technology still forward FCoE frames hop-by-hop using the FC Destination_Identifier (D_ID). Conversely, Ethernet networks may implement Ethernet Layer 2 Multi Path (L2MP) technologies, such as Transparent Interconnection of Lots of Links (TRILL) and Shortest Path Bridging (SPB) that use link-state routing protocols instead of FSPF. Hence, within a unified data center network, the routing and data forwarding policies for the FCoE network may be incompatible with the Ethernet network. Accordingly, the unified data center network manages separate data and control planes when the FCoE network and Ethernet network are completely or partially logically separated from each other. One data plane and one control plane manages the data for the Ethernet network, while a second data plane and a second control plane manages the data for FCoE network. Thus, new technology is necessary to reduce the complexity of the unified data center network caused from managing the dual data and control planes.

SUMMARY

In one embodiment, the disclosure includes an apparatus for forwarding an FCoE data frame into an Ethernet network comprising a processor configured to receive a data frame on a input port, obtain a first destination address and a virtual local area network identifier (VID), determine whether the first destination address and the VID matches an entry within a forwarding table, construct a key when the first destination address and VID matches the entry and the data frame is a FCoE frame, and forward the data frame as an outgoing data frame via an output port when the key matches a rule that permits forwarding the data frame.

In yet another embodiment, the disclosure includes an apparatus comprising an apparatus for forwarding an Ethernet data frame from an Ethernet network to a FCoE node comprising a data path module comprising a FCoE enabled port and a Ethernet enabled port, and a FCoE control and management module coupled to the data path module, wherein Ethernet enabled port receives the Ethernet data frame, wherein the Ethernet data frame is forwarded via the FCoE enabled port, wherein the FCoE control and management module comprises a MAC forwarding table used to forward the Ethernet data frame, and wherein the FCoE control and management module is configured to obtain a destination Media Access Control (DMAC) and a VID from the Ethernet data frame, determine whether the DMAC and VID matches an entry in the MAC forwarding table, and forward the Ethernet data frame to the FCoE enabled port when the DMAC and VID matches the entry.

In a third embodiment, the disclosure includes a method for forwarding FCoE frames over a TRILL based network, the method comprising associating a virtual N_Port (VN_Port) with an FCoE Routing Bridges (FRB) Nickname, wherein the FRB Nickname indicates the location of the VN_Port, receiving an incoming data frame that comprises a first DMAC and a VID, performing a table lookup using a second DMAC and the VID to determine whether the second DMAC and VID match an entry within a MAC forwarding table, determining whether the incoming data frame comprises a FCoE encapsulation data segment, determining whether an Access Control List (ACL) rule permits forwarding the incoming data frame, and forwarding the data frame when: the ACL rule permits forwarding the incoming data frame, the second DMAC and VID matches the entry, and the incoming data frame comprises a FCoE encapsulation data segment.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a schematic diagram of an embodiment of FCoE Initialization Protocol (FIP) location descriptor used to identify the location of an N_Port_ID.

FIG. 6 is a table describing the elements and size of an embodiment of the payload of N_Port_ID Allocation request.

FIG. 7 is a table describing the elements and size of an embodiment of the payload of N_Port_ID Allocation Switch Fabric Accept (SW_ACC).

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, apparatus, and system to carry FCoE frames over a unified data center network using one data plane and one control plane. The unified data center network may comprise an FCoE network and a regular Ethernet network that may completely or partially overlap. The Ethernet network may utilize link-state routing protocols that may include TRILL and SPB. FRBs that support FIP and link-state routing protocols may be located at the edge of the Ethernet network and may be coupled to ENodes. During a VN_Port fabric login and logout process, an FC/FCoE Fabric Server (FFS) may associate a switch name with an FRB Nickname to identify the location information for N_Port_IDs associated with ENodes. Furthermore, the ENode MAC addresses may be added or deleted as static entries from the FRB MAC forwarding table. The forwarding tables may not need to be dynamically updated after the FIP FLOGI process. Afterwards, FRBs may encapsulate and forward FCoE frames based on the DMAC and FCoE Ether-Type. The same ingress and egress FRB Nickname may be encoded as the FCoE frame travels through Ethernet network. ENodes may also be configured to forward FCoE frame using the destination VN_Port MAC address as the DMAC.

Figure 1:
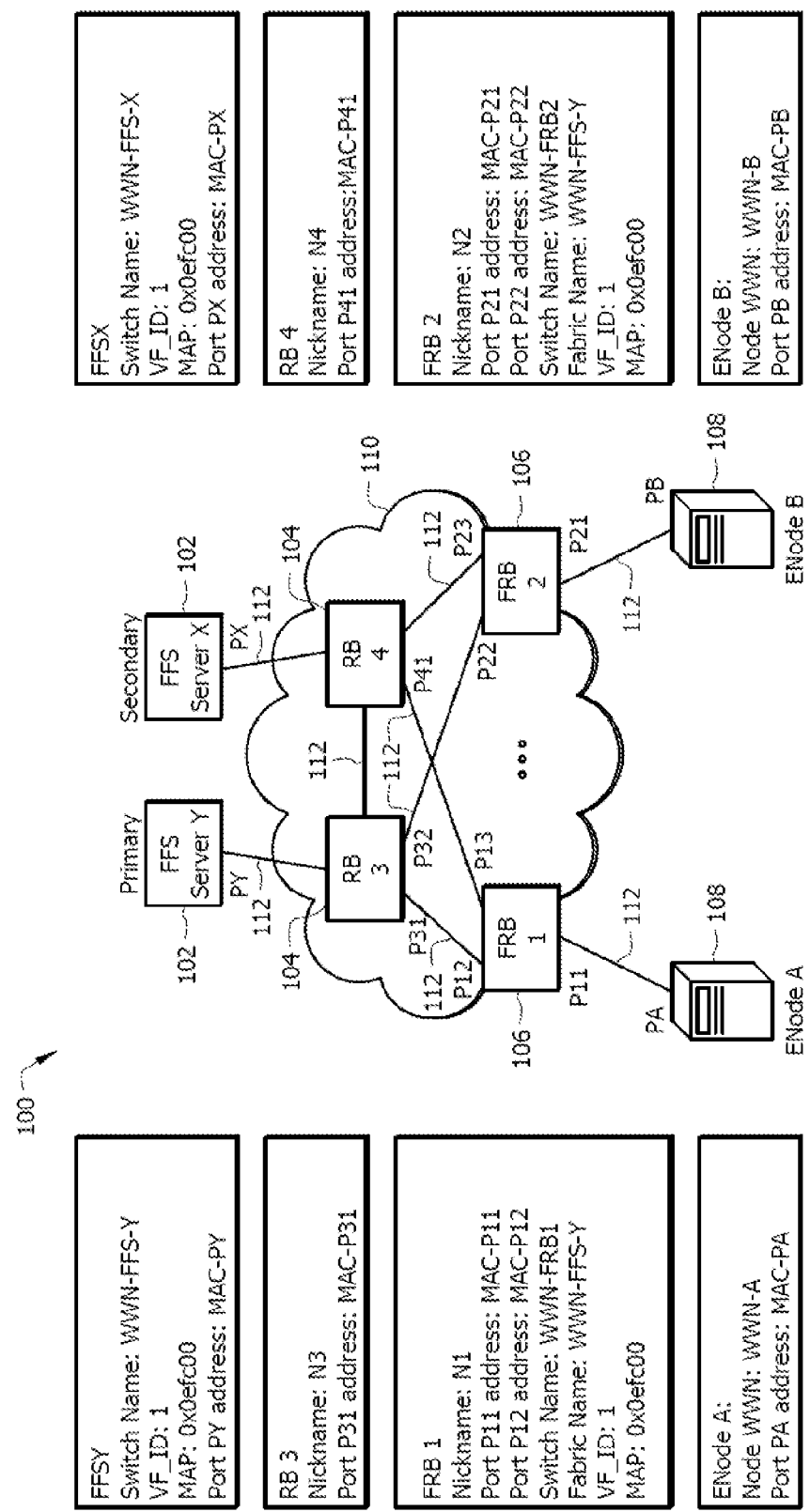
FIG. 1 is a schematic diagram of an embodiment of a unified data center network that forwards FCoE frames over an Ethernet network using one data and control plane.

FIG. 1 is a schematic diagram of an embodiment of a unified data center network 100 that forwards FCoE frames over an Ethernet network using one data and control plane. The unified data center network 100 may comprise at least one of the following group: FFS 102, Routing Bridges (RBridges) 104, FRBs 106, and ENodes 108. Network nodes, such as RBridge 104 and FRBs 106, may be located within an Ethernet network 110 that transports Ethernet and FC/FCoE data. The Ethernet network 110 may be a network comprising one or more local area networks (LANs), virtual networks, and/or wide area networks (WANs). The Ethernet network 110 may comprise a regular Ethernet network and an FCoE network that partially or completely overlap physically and/or logically. In other words, network nodes within the overlapped portions of Ethernet network 110 may be configured to transport both Ethernet and FCoE frames. The Ethernet network 110 may be configured to implement L2MP technologies, such as TRILL, SPB, and any other link-state routing protocols. The FRBs may be positioned at the edge of the Ethernet network 110 and may be coupled to ENodes 108. FFSs 102, RBridges 104, FRBs 106, and ENodes 108 may be coupled together via link 112. Link 112 may be direct links, such as fiber optic links, electrical links, and wireless links, or indirect links, such as logical connections, virtual connections or physical links with intervening RBridges 104, FRBs 106, and/or other network devices not shown in FIG. 1. Persons of ordinary skill in the art are aware that other embodiments of unified data center network 100 may have differing network topologies.

FIG. 1 depicts a primary FFS Y 102 and a secondary FFS X 102. Other embodiments of the unified data center network 100 may include only one FFS 102 or more than two FFSs 102 for redundancy purposes. The FFS 102 may be implemented in, but not limited to a physical or virtual server, an appliance, within an RBridge, and/or one or more FCFs. The FFS 102 may be configured to assign N_Port identifiers (N_Port_IDs) to Virtual N_Ports (VN_Ports) and/or N_Ports, and provide a variety of FCoE services that may include, but are not limited to Name Server, Zoning, and Registered State Change Notification (RSCN). An FFS 102 may appear as an FCF to the FRBs 106, and may be configured with a switch name (e.g. World Wide Name (WWN)) that may be a 64-bit number. As shown in FIG. 1, the primary FFS Y 102 may have a switch name of "WWN-FFS-Y," while the secondary FFS X 102 may have a switch name of "WWN-FFS-X." The switch name for the primary FFS Y may be used as the fabric name for FRBs 106 under the control of FFS Y 102. The primary FFS 102 may associate a switch name with the FRB 106 Nickname to identify the location of a VN_Port inside an ENode. The unified data center network 100 may be configured to use the switch name to select the primary FFS 102. In one embodiment of the unified data center network 100, the primary FFS Y 102 may be designated based on the higher numerical value of the switch name. The switch name that has the higher numerical value may be designated the primary FFS 102. FIG. 1 illustrates that FFS Y 102 is selected as the primary FFS 102 because the switch name for FFS X (e.g. FFS-X) has a lower numerical value than FFS Y's 102 switch name (e.g. FFS-Y). Persons of ordinary skill in the art are aware that other methods may be used to designate the primary FFS 102.

Each FFS 102 may also be configured with the following parameters: at least one Virtual Fabric ID (VF_ID), a MAC Address Prefix (MAP), and at least one FCF-MAC Port addresses. FIG. 1 illustrates that the FFSs 102 may have a VF_ID value of one, a MAP of "0x0efc00", and a FCF-MAC Port address of "MAC-PY" for FFS Y 102 and "MAC-PX" for FFS X 102. The VF_ID may be used to identify the virtual fabrics (e.g. virtual service instances) that the FFS may belong to. Each virtual fabric may have independent data paths, configuration settings (e.g. FCoE zoning settings and Quality of Service (QoS)), and management settings. Each FFS 102 may be configured to support more than one virtual fabric. For example, FFS Y 102 may be configured to have VF_ID of one (shown in FIG. 1) and a VF_ID of two (not shown in FIG. 1). The MAP value may be a default value that may be cascaded with N_Port_IDs to form MAC address used in MAC forwarding table. Cascading MAP values with N_Port_IDs will be discussed in more detail below. The FCF-MAC Port addresses may correspond to the MAC addresses for the FFS's 102 ports. FIG. 1 illustrates that the primary FFS Y 102 may have a port with a FCF-MAC Port address of "MAC-PY" from FFS Y 102 used to couple to RBridge 3 104 via link 112. FFS 102 may also comprise well-known FC service addresses (e.g. 0xFFFFFC). The unified data center network 100 may use the FCF-MAC port address as the location information that references the well-known FC service address. The well-known FC server addresses may be learned during a Virtual Adjacent Port (VA_Port) to VA_Port link establishment process.

FFS 102 may comprise a plurality of VA_Ports and a plurality of Virtual E_Ports (VE_Ports). FFS 102 may not comprise of other types FC/FCoE ports (e.g. Virtual F_ports (VF_Ports), VN_ports, F_Ports, and N_Ports). The VA_Port may be used to communicate with FRBs 106. In FIG. 1, each FFS 102 may use VA_Port to VA_Port virtual links to communicate with FRBs 106. VA_Port to VA_Port virtual links may be instantiated between the FFS 102 and FRBs 106. FFS 102 may also communicate with each other via VE_Port or regular Internet Protocol (IP)/Ethernet.

An RBridge 104 may be any network node configured to implement the TRILL protocols, as defined in Internet Engineering Task Force (IETF), and may be compatible with other network nodes that implement different routing protocols, such as IP version 4 (IPv4) and IP version 6 (IPv6). An RBridge 104 may comprise a unique Nickname about 16-bits long and a plurality of ports that may be assigned with unique MAC Port addresses. The Nickname may be used as location information to reference an RBridge 104. Additionally, Nicknames may be encoded into a TRILL encapsulated frame and may be used to determine where to forward the TRILL encapsulated frame. Nicknames (e.g. Egress Nicknames) may be used in a forwarding table lookup to obtain the next-hop MAC port address. The TRILL encapsulated frames may be forwarded or received on a port with a unique MAC Port address. The unique MAC Port addresses may also be encapsulated as a DMAC and/or source MAC (SMAC) when forwarding TRILL encapsulated frames.

FIG. 1 illustrates that RBridge 3 104 may have one port coupled to the MAC-PY port of the primary FFS Y 102. Recall that other embodiments of the unified data center network 100 may have the FFS 102 coupled to two or more different RBridges 104 (e.g. for a dual-homing configuration). An FFS 102 may use two different FCF-MAC port addresses that couple to two different RBridges 104. In this embodiment, the location information for the FFS 102 may include two different Nicknames of the RBridges 104. If the paths for the two different RBridges 104 have equal cost paths, an FRB 106 may forward FCoE service request and FCoE frames to the FFS using load balance over the equal cost paths. FIG. 1 also illustrates that RBridge 3 104 may have another two ports coupled to two different FRBs 106, and assigned with the MAC address of "MAC-P31," and "MAC-P32." Other embodiments of the unified data network 100 may include RBridges 104 coupled to other RBridges 104 and/or other network nodes.

FRBs 106 may be RBridges 104 that are configured to process FIP and some control and management related FCoE frames. FRBs 106 may be edge nodes located within Ethernet network 110 that may be coupled to ENodes 108, RBs 104, FRBs 106, and/or other network nodes not shown in FIG. 1. For notation purposes, an FRB 106 may be designated as an ingress FRB 106 in this disclosure when the FRB 106 receives a frame from an ENode 108 and forwards the frame to network nodes within Ethernet network 110. Alternatively, a FRB 106 may be designated as an egress FRB 106, when the FRB receives a frame for a network node within the Ethernet network 110, and subsequently forwards the frame to an ENode 108.

Each FRB 106 may be configured with a Nickname and MAC port address parameters as discussed for RBridges 104. Apart from RBridge related parameters, each FRB 106 may be further configured with a switch name, a fabric name, a VF_ID, and a MAP. The switch name, VF_ID and MAP parameters are substantially the same parameters as discussed for the switch name, VF_ID and MAP parameters for FFSs 102. The fabric name may have the same value as the switch name of the FFS 102 that controls and manages the FRB 106.

Not shown in FIG. 1, the FRB 106 may also be configured to include a FCoE virtual local area network (VLAN) ID (VID) that may be associated with the VF_ID. For example, an FCoE VLAN may have a VID of VLAN 10, which may be used to support virtual fabric with VF_ID equal to one. Similar to FFS 102, FRBs 106 may be configured to support more than one virtual fabric. Hence, in a non-limiting example, another FCoE VLAN with VID of VLAN 20 may be used to support virtual fabrics with VF_ID equal to two. The switch name, VF_ID, MAP, and FCoE VID values may be based on each virtual fabric within a FFS 102 and FRB 106. The functional operations of FRBs 106 will be discussed in more detail in FIG. 2.

In the virtual domain, FRB 106 may comprise a plurality of VA_Ports and VF_Ports. As discussed earlier, VA_Port to VA_Port virtual links may be instantiated between FRBs 106 to FFS 102. FRBs 106 may also instantiate VF_Port to VN_Port virtual links to communicate with ENodes 108, which may exchange FCoE frames. In the FC domain, the FRB 106 may use F_Ports to exchange FC frames with the ENodes' 108 N_Ports, and thereby create an FC connection.

ENode 108 may be any device configured to support FC and/or FCoE interfaces. ENodes 108 may comprise N_Ports (e.g. for FC) or VN_Ports (e.g. for FCoE). ENodes 108 may include hosts, servers, storage devices or other types of end devices that may originate data into or receive data from Ethernet network 110. ENodes 108 may be a virtualized server that comprises multiple virtual servers called virtual machines (VMs). ENodes 108 may be coupled to FRBs 106 via ports that face ENodes 108, which may appear as FCF-MAC port or FCoE data forwarder (FDF)-MAC Port to ENodes 108. FIG. 1 illustrates that port P11 on FRB 1 106 faces ENode A 108 while port P21 on FRB 2 106 faces ENode B 108 as shown in FIG. 1. The MAC address for P11 (e.g. MAC-P11) and P21 (e.g. MAC-P21) may appear as FCF-MAC or FDF-MAC port addresses to ENode A 108 and ENode B 108, respectively. Ports P11, port P21, port PA, and port PB may be physical ports. As physical ports, Port P11 and port P21 that may be associated with one or more VF_Ports, while Ports PA and Port PB may be associated with one or more VN_Ports. Hence, port P11 may be associated with a VF_Port coupled to a VN_Port of ENode A 108, and port P21 may be associated with a VF_Port coupled to a VN_Port of ENode B 108. The physical ports may be designated as ENode MACs with unique MAC addresses. In FIG. 1, ENode A 108 may have a physical port PA with a MAC Port address of "MAC-PA," while ENode B 108 may have a physical port PB with a MAC address of "MAC-PB." One embodiment of ENode 108 may be as described in Rev. 2.00 for Fiber Channel Backbone (FC-BB-5) of the INCITS T11, published Jun. 4, 2009, which is incorporated herein as if reproduced by its entirety.

Figure 2:
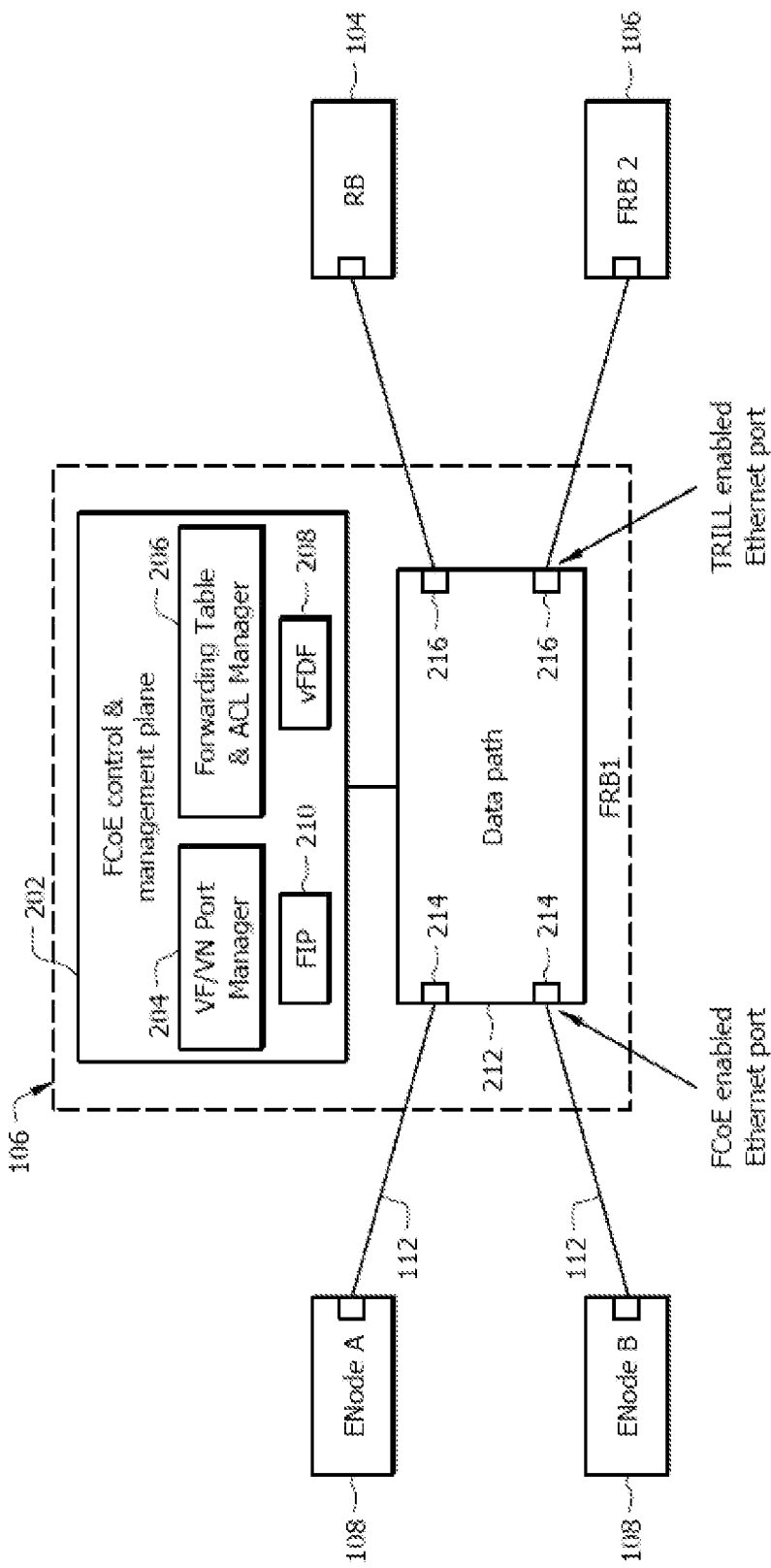
FIG. 2 is a schematic diagram of an embodiment of an FRB.

FIG. 2 is a schematic diagram of an embodiment of an FRB 106. The FRB 106 may comprise a FCoE control module 202 and a data path module 212. In FIG. 2, the data path module 212 may comprise FCoE enabled Ethernet ports 214 (e.g. VF_Port) and TRILL enabled Ethernet ports 216. The FCoE enabled Ethernet port 214 may be configured to transmit or receive an FCoE data frame or regular Ethernet frames from an ENode 108, while the TRILL enabled Ethernet port 216 may be configured to transmit or receive a TRILL encapsulated data frame from an RBridge 104, an FRB 106, and/or any other network node capable of receiving a TRILL encapsulated data frame. The data path module 212 may be configured to logically and/or physically route incoming data frames within FRB 108 from one port to another port. Incoming data frames from one port may be routed to another port based on the forwarding table and ACL rules set by the ACL manager module 206 and destination addresses (e.g. DMAC) and VID within incoming data frames. Using FIG. 2 as an example, an incoming data frame from ENode A 108 may be routed to the TRILL enabled Ethernet port 216 corresponding to RBridge 104.

The FCoE control module 202 may comprise a VF_Port/VN_Port manager module 204, a forwarding table and ACL manager module 206, a virtual FDF module (vFDF) 208, and a FIP module 210. The VF_Port/VN_Port manager module 204 may be responsible for instantiating VF_Ports (e.g. FCoE enabled Ethernet port 214) and associating the VF_Ports to VN_Ports located at one or more ENodes 108. Recall that VF_Ports may be ports on a FRB 106 that faces an ENode 108. Using FIG. 1 as an example, the VF_Port/VN_Port manager module 204 may associate VF_Port in FRB 1 106 to the VN_Port in ENode A 108. FCoE data and service frames may be forward from a VN_Port to a VF_Port or vice versa after the VF_Port/VN_Port manager module 204 instantiates a (virtual) link 112 between the VF_Port and VN_Port.

An FRB 106 may appear as an FDF with only one FDF-MAC port address to the FFSs using the vFDF (virtual FDF) module 208. The vFDF module 208 may use the Switch MAC address as the FDF-MAC port address. The vFDF module 208 may also establish VA_Port to VA_Port links with FFSs using the FIP protocol. Using FIG. 1 as an example, FRB 1 106 may have a Switch MAC address of "MAC-N1," which the vFDF module 208 may establish as the FDF-MAC port address. The primary FFS Y 102 may establish a VA_Port to VA_Port link from the vFDF MAC port address, "MAC-N1" to the FFS Y's 102 FCF-MAC Port address of "MAC-PY".

The FIP module 210 may perform FIP related functions between ENodes 108 and FRBs 106, and between FRBs 106 and FFSs 102 after establishing VF_Port to VN_Port links and VA_Port to VA_Port links, respectively. The FIP protocol may be used between an ENode 108 and an FRB 106 as if the FRB 106 is an FCF or FDF switch. The Switch fabric Internal Link Service (SW_ILS) message may be used for communications between an FRB 108 and an FFS via one or more established VA_Port to VA_Port links. The primary FFS may not compute FDF forwarding table for each FRB 106 and no VA_Port to VA_Port links may be established between FRBs 106 because FRBs forward FCoE frames based the frame DMAC. Multicast FIP discovery solicitation and advertisement frames may be sent via a distribution tree to all FRBs 106 and FFSs that have the same VF_ID. The distribution tree may be substantially similar to the trees computed in TRILL, SPB, and other networks utilizing link-state routing protocols. Multicast FIP frames received on a VA_Port may not be propagated via VF_Ports to ENodes 108.

The forwarding table and ACL manager module 206 may be responsible for managing the MAC forwarding table, such as adding or deleting a static entry, and setting up ACL rules used to forward data from the FRB 108. The entries in the MAC forwarding table may be static in that the entries may not be dynamically altered when forwarding data frames. The entries within the MAC forwarding table may be altered during the fabric login and logout process. The MAC forwarding table (see FIG. 4) may comprise a MAC Address field, a VID field, an output port field, and a next-hop RBridge MAC field.

The MAC Address field stores a MAC addresses that a DMAC may reference when performing a lookup against the MAC forwarding table. The MAC Address field may reference the MAC address for different nodes, such as ENodes 108 and the FFSs. The MAC Address for the ENodes 108 and FFSs may concatenate (i.e. ||) the MAP value with the N_Port_ID associated with the node. For example, if ENode A 108 has a N_Port_ID of 3.8.1, then the MAC Address of ENode 108 may equal MAP value concatenated with 3.8.1 or MAP||3.8.1. Additionally, using FIG. 1 as an example, the primary FFS Y 102 may have a well-known FC service address of 0xFFFFFC, and thus have MAC address of the MAP value concatenated with 0xFFFFFC or MAP||0xFFFFFC (see FIG. 4 for example of entry). The VID field indicates the FCoE VLAN used to support virtual fabrics with the same VF_ID. The output port field may indicate the port on the FRB 106 that may be used to forward data frames to the next-hop destination.

The next hop RBridge MAC field may store the MAC address of a port of the next-hop RBridge or FRB. For ENodes 108 and FFS, the location information (e.g. MAC-PY for FFS Y server 102 in FIG. 1) may be obtained during the fabric login process. FFS may also obtain the location information during the VA_Port to VA_Port link establishment process. Once the location information is known, the next-hop information within the next hop RBridge MAC field may be derived from the Intermediate System to Intermediate System (IS-IS) routing protocol used by TRILL. Using FIG. 1 as an example, FRB 2 106 may receive a data frame from ENode B 108 that needs to be forward to ENode A 108. To forward the data frame to ENode A 108, the data frame may initially travel from FRB 2 106 to RBridge 3 104. Hence, the MAC forwarding table of FRB 2 106 may have in the next hop RBridge MAC field "MAC-P32" for ENode A 108 entry. Another embodiment of the RBridge MAC field may store a pointer that points to a set of next-hop RBridge MACs when multiple equal-cost paths may exist between the FRB and a network node within the Ethernet network.

The forwarding table and ACL manager module 206 may also setup ACL rules. ACL rules may be used to identify, classify, and filter data traffic. Setting up the ACL rules may depend on the configuration of the ENode 108. An ENode 108 may be configured to transmit a FCoE frame such that the DMAC within the FCoE frame has the destination MAC address and not the FCF-MAC address. The ENodes 108 may also be configured to perform a source binding check, where the ENode 108 checks whether the last three octets of SMAC matches the Source ID (S_ID). Hence FRB 106, may no longer perform the source binding check when the ENode performs the source binding check. With the ENode 108 configured as described above, a forwarding table and ACL manager module 206 may check whether the port expects the SMAC of the arriving FCoE frame, and whether the FCoE frame may be forwarded to the destination ENode 108 within the same zone. To perform the check, the forwarding table and ACL manager module 206 may construct a key using the SMAC, In_Port_ID, VID and Zone_ID. The Zone_ID may be a returned value from a MAC forwarding table lookup using the DMAC and VID. The length of Zone_ID may depend on the specific hardware implementation, the number of zones, and other grouping purpose. The VID may not be used during the lookup process when there is a limitation on the width of the key. Processing of the key will be discussed in more detail in FIG. 9.

The forwarding table and ACL manager module 206 may also track the N_Port_IDs and the locations of the N_Port_IDs that may communicate with the local N_Port_ID associated with the FRB 106. For example, in FIG. 2, the local N_Port_ID associated with FRB 106 may be the N_Port_IDs for ENode A and B 108. N_Port_IDs that may communicate with ENode A and B 108 may include the FFS and other ENodes 108. The FRB 106 may receive the N_Port_ID information during the fabric login process using the N_Port_ID Allocation SW_ACC message or ZAD request message. The FLOGI process and distributed zoning enforcement will be discussed in more detail below.

Figure 3:
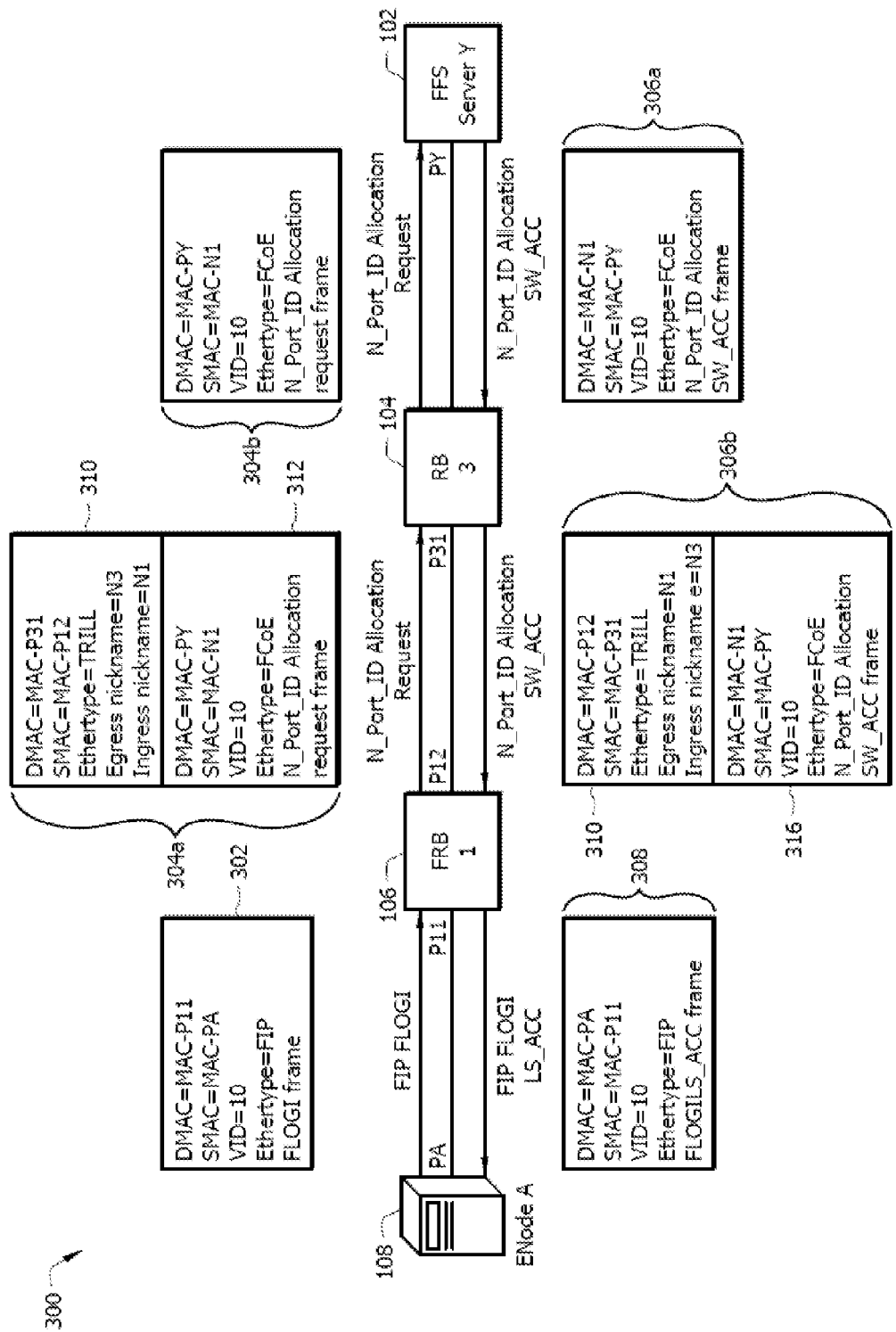
FIG. 3 is a schematic diagram of an embodiment of the fabric login (FLOGI) process.

FIG. 3 is a schematic diagram of an embodiment of the FLOGI process 300. The FIP FLOGI message 302 may be initially sent from the ENode A 108 to FRB 1 106. Afterwards, FRB 1 106 may terminate the FIP FLOGI message 302 and subsequently transmit a N_Port_ID Allocation Request SW_ILS message 304*a* to RBridge 3 104. RBridge 3 104 may subsequently forward the N_Port_ID Allocation Request SW_ILS message 304*b* to the primary FFS Y 102. After the primary FFS Y 102 receives the N_Port_ID Allocation Request SW_ILS message 304*b*, the primary FFS Y 102 may transmit a N_Port_ID Allocation SW_ACC message 306*a* to RBridge 3 104. RBridge 3 104 may then forward N_Port_ID Allocation SW_ACC message 306*b* to FRB 1 106. Once, FRB 1 106 receives the N_Port_ID Allocation SW_ACC message 306*b*, the FRB 1 106 may transmit a FIP FLOGI link service accept (LS_ACC) message 308 back to ENode A 108.

The FIP FLOGI message 302 and FIP FLOGI LS_ACC message 308 may comprise a DMAC, a SMAC, a VID, and EtherType. The DMAC may indicate the MAC address for the FCoE next-hop port address. As shown in FIG. 3, when the FIP FLOGI message 302 is sent from the ENode A 108 to FRB 1 106, the DMAC value within the FIP FLOGI message 302 may equal the port MAC address, MAC-P11, the FCF-MAC (or FDF-MAC) port that receives the FIP FLOGI message 302. The SMAC may have the MAC Port address that transmits the FIP FLOGI message 302. FIG. 3 illustrates that the FIP FLOGI LS_ACC message 308 is sent from FRB 1 106 to ENode A 108. Hence, the DMAC and SMAC values for the FIP FLOGI LS_ACC message 308 may be reversed when compared to the FIP FLOGI message 302. As discussed before, the VID may identify the FCoE VLAN used to forward the FIP FLOGI message 302 and FIP FLOGI LS_ACC message 308. The EtherType may identify the type of encapsulation used for the messages 302 and 308. As shown in FIG. 3, the FIP FLOGI messages 302 may be encapsulated as an FIP FLOGI frame, while the FIP FLOGI LS_ACC message 308 may be encapsulated as a FIP FLOGI LS_ACC.

The N_Port_ID Allocation Request SW_ILS message 304*a* and N_Port_ID Allocation SW_ACC message 306*b* may comprise a TRILL encapsulation segment 310. The TRILL encapsulation 310 may comprise a DMAC, SMAC, EtherType, Egress Nickname, and Ingress Nickname. The DMAC may be the port address of the next-hop RBridge (or FRB). The SMAC may be the sending port MAC address, and EtherType indicates the Ethernet frame is a TRILL frame. The Egress Nickname may reference the FRB 106 or RBridge 104 directly connected to the ENode 108 or FFS 102. In FIG. 3, because RBridge 3 104 is the network node directly connected the FFS Y 102, the Egress Nickname for the N_Port_ID Allocation Request SW_ILS message 304*a* references RBridge 3 104 (e.g. "N3"). The Ingress Nickname may reference the network node (e.g. FRB 106) that directly connects to the ENode 108 or FFS 102 that originated the data frame. FIG. 3 depicts that N_Port_ID Allocation SW_ILS message 304*a* originates from ENode A 108 as an FIP FLOGI with FRB 1 106 directly connected to it. As a result, the Ingress Nickname for N_Port_ID Allocation SW_ILS message 304*a* is "N1," which references FRB 1 106.

The N_Port_ID Allocation Request SW_ILS message 304*a* may further comprise a FCoE N_Port_ID Allocation Request encapsulation segment 312. FCoE N_Port_ID Allocation Request encapsulation segment 312 may comprise a DMAC, SMAC, VID, and EtherType field substantially similar to the DMAC, SMAC, VID, and EtherType found in the FIP FLOGI 302, respectively. However, the DMAC for N_Port_ID Allocation Request SW_ILS message 304*b* may have value of the FCF-MAC port address of the FFS 102 (e.g. MAC-PY), while the SMAC references the switch ID of the FRB 106 that is directly connected to the ENode 108 (e.g. FRB 1 106 in FIG. 3).

The N_Port_ID Allocation SW_ACC message 306*a* may further comprise a FCoE N_Port_ID Allocation SW_ACC encapsulation segment 316. The FCoE N_Port_ID Allocation SW_ACC encapsulation segment 316 may comprise a DMAC, SMAC, VID, and EtherType field substantially similar to the DMAC, SMAC, VID, and EtherType found in the FCoE N_Port_ID Allocation Request encapsulation segment 312. However, the values in the DMAC and SMAC may be reversed because the N_Port_ID Allocation SW_ACC message 306*a* originates from the FFS 102. The payload differences between the N_Port_ID Allocation Request SW_ILS message 304*a* and the N_Port_ID Allocation SW_ACC message 306*a* may be illustrated in FIGS. 6 and 7.

FIG. 3 also illustrates that the N_Port_ID Allocation Request SW_ILS message 304*a* and N_Port_ID Allocation SW_ACC message 306*b* may comprise TRILL encapsulation segments 310 and 312 when transmitted through an Ethernet network. However, N_Port_ID Allocation Request SW_ILS message 304*b* and N_Port_ID Allocation SW_ACC message 306*a* may be transmitted with only FCoE encapsulation when the messages are forwarded directly from an RBridge 3 104 to the FFS Y 102.

Figure 4:
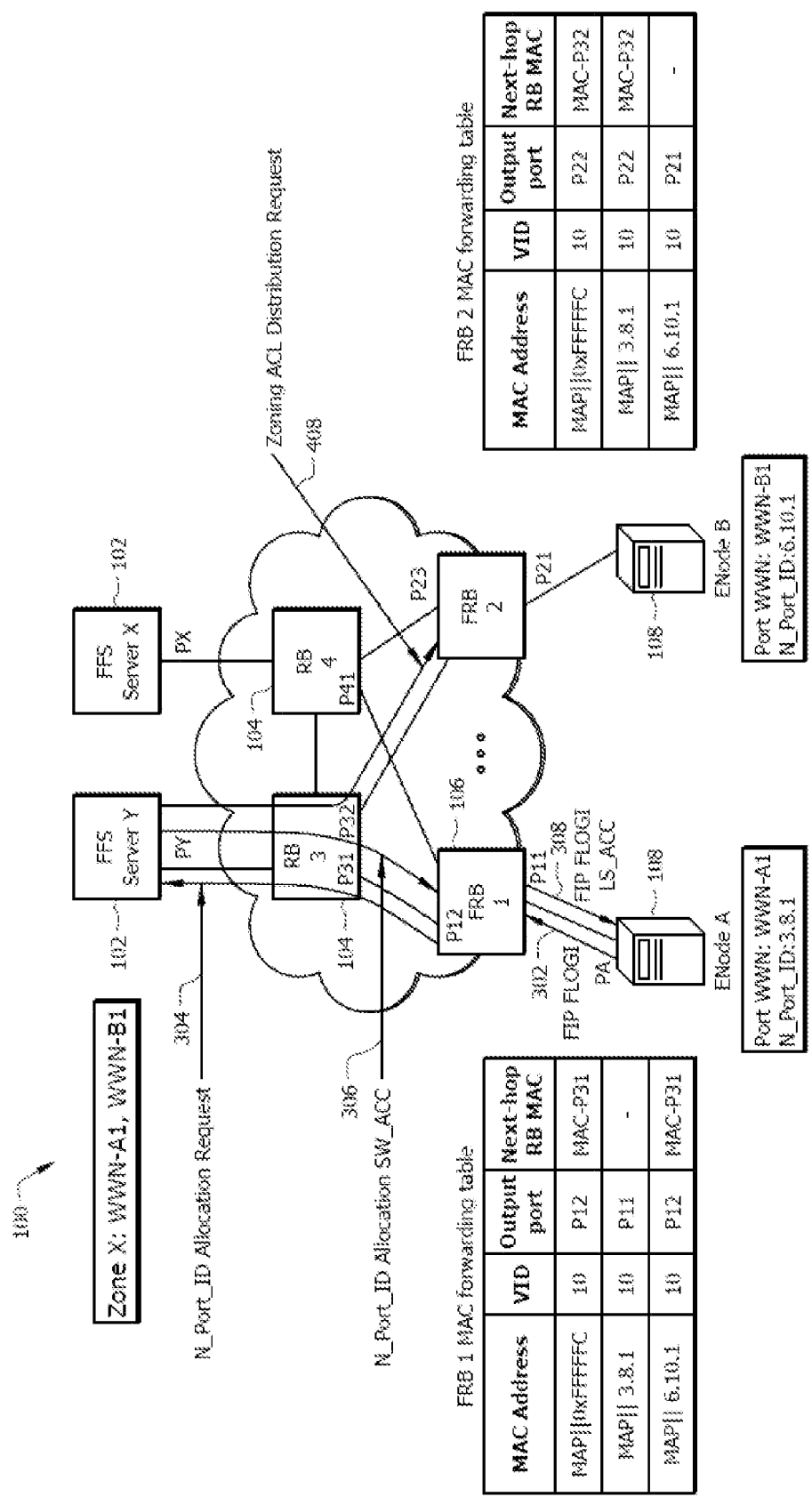
FIG. 4 is a schematic diagram of an embodiment of the unified data network during a FLOGI process and distributed zoning enforcement.

FIG. 4 is a schematic diagram of an embodiment of the unified data network 100 during a FLOGI process and distributed zoning enforcement. The FLOGI process is the same process as described in FIG. 3. In FIG. 4, ENode A 108 may initially send FIP FLOGI message 302 to FRB 1 106. Once receiving the FIP FLOGI message 302, FRB 1 106 may terminate the request and generate an N_Port_ID Allocation Request SW_ILS message 304. The N_Port_ID Allocation Request SW_ILS message 304 may be sent to the primary FFS Y 102 via RBridge 3 104. Embodiments of the N_Port_ID Allocation Request SW_ILS message 304 may include, but are not limited a TRILL or SPB encapsulation.

After receiving the N_Port_ID Allocation Request SW_ILS message 304, the primary FFS Y 102 may assign an N_Port_ID to the VN_Port within the ENode that sent the FIP FLOGI request 302. As shown in FIG. 4, the primary FFS Y 102 may assign the VN_Port of ENode A 108 with N_Port_ID of 3.8.1. The primary FFS Y 102 may also send an N_Port_ID Allocation SW_ACC message 306 to FRB 1 106. The VN_Port may be allowed to access N_Port_IDs carried in the payload of N_Port_ID Allocation SW_ACC message 306. Moreover, the payload may include the location information for those N_Port_IDs. The payload of the N_Port_ID Allocation SW_ACC will be discussed in more detail in FIG. 7.

After receiving the N_Port_ID Allocation SW_ACC message 306, the FRB 1 106 may use the N_Port_ID Allocation SW_ACC message 306 to add entries in the MAC forwarding table. In FIG. 4, FRB 1 106 may add two static entries to the MAC forwarding table, one entry for the MAC address of the VN_Port for ENode A 108 (e.g. MAP||3.8.1), and another entry for the MAC address of the destination N_Port_ID (e.g. MAP||6.10.1 in ENode B 108). If the VN_Port for FRB 1 106 is allowed to access multiple N_Port_IDs, then FRB 1 106 may add multiple static entries in the MAC forwarding table, where each static entry corresponds to an additional N_Port_ID. The FRB 1 106 may then send FIP FLOGI LS_ACC 308 to ENode A to confirm FLOGI of VN_Port for ENode A 108. An N_Port_ID Disallocation SW_ILS message may be used for a VN_Port/N_Port fabric logout, which may delete static entries in the MAC forwarding tables associated with the logged out VN_Port.

VN_Ports (e.g. in ENode A 108) may access FCoE fabric services by sending service requests to the well-known FC service addresses. As shown in the FIG. 4, the N_Port_ID for FFS Y 102 may be 0xFFFFFC and have a well-known MAC address of MAP||0xFFFFFC. Each FRB 1 and 2 106 may store the well-known MAC addresses derived from the well-known FC address as static entries in the MAC forwarding table. In one embodiment, the well-known FC addresses may be inputted automatically into the MAC forwarding table. RBridges 104 (e.g. RBridge 3 104) that directly connect to an FFS 102 may update the static entries in the MAC forwarding table for well-known MAC address when configuring the RBridges 104.

One embodiment of the ENode 108 may be configured to forward service request FCoE frames that have a DMAC of a well-known MAC addresses for an FFS 102. Using FIG. 4 as an example, ENode A 108 may send a service request FCoE frame to FRB 1 106 with a DMAC address of MAP||0xFFFFFC. By configuring ENode 108, FRB 160 and RBridge 104 as described above, the service request FCoE frames may be forwarded to the primary FFS Y 102 without FRB control plane involvement. Forwarding with a well-known MAC address may also be implemented for forwarding regular FCoE data frames, which will be discussed in FIGS. 9 and 11. Another embodiment of ENode 108 may use the MAC address of the ingress FRB 106 (e.g. FRB. 1 106) to forward service request FCoE frames. The FRB 106 may form a new DMAC with MAP and D_ID (e.g., 0xFFFFFC) and forwards the service request FCoE frame based on the new DMAC. This forwarding process will be discussed in more detail in FIGS. 12 and 13. In this case, the FRB 106 may terminate the original service request FCoE frame from ENode A 108.

FIG. 4 also illustrates that the primary FFS Y 102 may check the zones that the VN_Port belongs to by sending a ZAD Request SW_ILS message 408 to FRBs 106 directly connected to destination ENodes 108 (e.g. FRB 2 106 for ENode B 108). In FIG. 4, the unified data center network 100 may comprise Zone X that includes ENode A (e.g. WWN-A1) and ENode B 108 (e.g. WWN-B1). Other embodiments of the unified data center network 100 may comprise more than one zones (e.g. Zone Y). The ZAD Request SW_ILS message 408 may carry the information of the assigned N_Port_ID (e.g. 3.8.1) and the location information associated to the assigned N_Port_ID (e.g. FRB 1's 106 Nickname N1).

In FIG. 4, the primary FFS Y 102 may send ZAD Request SW_ILS message 408 to FRB 2 106 after receiving the N_Port_ID Allocation SW_ILS request message 304. The FRB 2 106 may be configured with an FDF switch name "WWN-FRB 2" and one peer entry with a peering N_Port_ID equal to 3.8.1, location information equal to N1, and peer N_Port_ID of 6.10.1 (e.g. ENode B 108). When the FRB 2 106 receives the ZAD Request SW_ILS message 408, FRB 2 106 may discover that peer N_Port_ID 6.10.1 may be directly connected to FRB 2 106, and thus the FRB 2 106 may add a static entry corresponding to the MAC address (e.g. MAP||3.8.1) of ENode A's 108 VN_Port to its MAC forwarding table.

As shown in FIG. 4, with the distributed zoning information, FRBs may populate in advance the source and destination N_Port_IDs for the MAC forwarding tables. In FIG. 4, the MAC forwarding table for FRB 2 106 may include a MAC forwarding table entry for a VN_Port in ENode A 108 (MAP||3.8.1) and a VN_Port in ENode B (MAP||6.10.1). The FRBs 106 may not need to implement dynamic MAC address learning from received FCoE frames. Instead, the FRBs 106 may store the MAC addresses of the initiators and targets that are allowed to communicate with each other in the FRB MAC forwarding table. For example, when the source ENode B 108 forwards a data frame to destination ENode A 108, the FRB 2 106 uses the DMAC address field of the data frame in MAC forwarding table lookup to forward the frame. An FCoE frame received by an FRB with unknown DMAC (e.g. a MAC address not within the MAC forwarding table) may be discarded. To enforce the zoning, an FRB may also need to setup some ACL rules based on the zoning information received in N_Port_ID Allocation SW_ACC message 306 or in ZAD Request SW_ILS message 408.

In one embodiment, the primary FFS Y 102 may transmit the ZAD Request SW_ILS message 408 to FRBs 106 via a distribution tree. For instance, a distribution tree may be used when the primary FFS Y 102 combines several ZAD request information into one ZAD Request SW_ILS message 408. Another instance may occur when multiple FRBs 106 exists within the unified data center network 100 and the ZAD Request SW_ILS message 408 is sent out as a multicast frame. When ZAD Request SW_ILS messages 408 are sent via a distribution tree, the recipient FDF switch name may be set to 0xFFFFFFFF. Each FRB 106 that receives the ZAD Request SW_ILS message 408 may determine whether a peer N_Port_ID in a peer entry is directly connected to the FRB 106. When a peer N_Port_ID is attached, the FRB 106 may add a static entry of the MAC address of the peering N_Port_ID to the FRB's 106 MAC forwarding table. For example, if FRB 2 106 receives a ZAD Request SW_ILS message 408 that has a peer N_Port_ID equal to ENode A 108, then no entry is added to the MAC forwarding table for FRB 2 106. After receiving a ZAD Request SW_ILS message 408, the FRB 106 may respond with unicast ZAD SW_ACC message. The payload of ZAD SW_ACC message may only have a SW_ILS code field with a value of 02000000h. The payload of the ZAD Request SW_ILS message 408 will be discussed in more detail in FIG. 8.

FIG. 5 is a schematic diagram of an embodiment of a FIP location descriptor 500 used to identify the location of an N_Port_ID. Recall that in FIG. 1, the primary FFS 102 may associate a switch name (e.g. WWN) with the FRB Nickname to identify the location of an N_Port_ID (e.g. VN_Port for ENode A 108). In one embodiment, a FIP location descriptor 500 may be added to the FIP Exchange Link Parameter (ELP) Request, which contains the Nickname information of an FRB 106. The FIP location descriptor 500 may be encoded as a type-length-value (TLV) element and may comprise a type ID 502, a length field 504, and a value field 506. The type ID 502 may be about one byte long and may indicate the TLV element is a location descriptor. The length field 504 may be about one byte long and indicate the length of the value field 506. The value field 506 may be about two bytes long and indicate the Nickname for the requesting FRB. FIG. 5 illustrates the type ID 502 may have a value of 32, but other embodiments of the location descriptor 500 may use other unused type ID values. Another embodiment may add FIP location descriptor 500 to the payload of each N_Port_ID Allocation Request message.

FIG. 6 is a table describing the elements and size of an embodiment of the payload of N_Port_ID Allocation request 600. The payload of N_Port_ID Allocation request 600 may comprise a SW_ILS code 602, Requesting FDF Switch_Name field 604, a Primary FCF Switch_Name field 606, a F_Port name field 608, and a FLOGI/Fabric Discovery (FDISC) parameters 610. In regards to the Requesting FDF Switch_Name field 604 and a Primary FCF Switch_Name field 606, the FDF may refer to an FRB, while the FCF may refer to an FFS. The payload of N_Port_ID Allocation request 600 may start with a SW_ILS code 602, which may be about four bytes long. The SW_ILS code 602 may define the type of SW_ILS message encoded in the payload (e.g. N_Port_ID Allocation Request message). The SW_ILS code 602 may be followed by the Requesting FDF Switch_Name field 604, which may be about eight bytes long and reference the FRB's switch name that sent the N_Port_ID Allocation request. The Primary FCF Switch_Name field 606 may be about eight bytes long and may reference the switch name of the FFS sever receiving the N_Port_ID Allocation request. The F_Port name field 608 may be about four bytes long and may reference the F_Port or VF_Port used to communicate with the ENode that sent the FIP FLOGI request. The FLOGI/FDISC parameters field may be about 116 bytes long and may indicate parameters well known in the art for a FIP FLOGI or FIP FDISC.

FIG. 7 is a table describing the elements and size of an embodiment of the payload of N_Port_ID Allocation SW_ACC 700. The payload of N_Port_ID Allocation SW_ACC 700 may comprise a SW_ILS code 702, a Primary FCF Switch_Name field 704, a Recipient FDF Switch_Name field 706, a Reserved field 708, an Allocated N_Port_ID field 710, a FLOGI/FDISC LS_ACC field 712, the Number of allowed peers field 714, and at least one Peer N_Port_ID and location information field 716. The SW_ILS code 702 may be substantially similar as the SW_ILS code 602, except the value within SW_ILS code 702 may differ from the SW_ILS code 602. In one embodiment the SW_ILS code 702 may have a value of x02000000h. The primary FCF Switch_Name field 704 may be about eight bytes long and may reference the switch name of the FFS sever sending the N_Port_ID Allocation SW_ACC message. The Recipient FDF Switch_Name field 706 may be about eight bytes long and reference the FRB's switch name that may receive the N_Port_ID Allocation SW_ACC message. The Reserved field 708 may be about one byte long and may be reserved for other purposes. The Allocated N_Port_ID field 710 may about three bytes long and may indicate the N_Port_ID assigned for the VN_Port of the ENode that sent the FIP FLOGI message. The FLOGI/FDISC LS_ACC field 712 may be about 116 bytes long and may indicate parameters well known in the art for a FIP FLOGI or FIP FDISC LS_ACC. The Number of allowed peers field 714 may about four bytes long and indicate the number of Peer N_Port_ID and location information field 716 within the payload of N_Port_ID Allocation SW_ACC 700. The Peer N_Port_ID and location information field 716 may about eight bytes long and indicate peer N_Port_IDs and the location information of the N_Port_IDs that may communicate with the VN_Port of the ENode that sent the FIP FLOGI. As shown in FIG. 7, one or more Peer N_Port_ID and location information fields 716 (e.g. 716a-716p) may be encoded within the payload of N_Port_ID Allocation SW_ACC 700.

Figure 8:
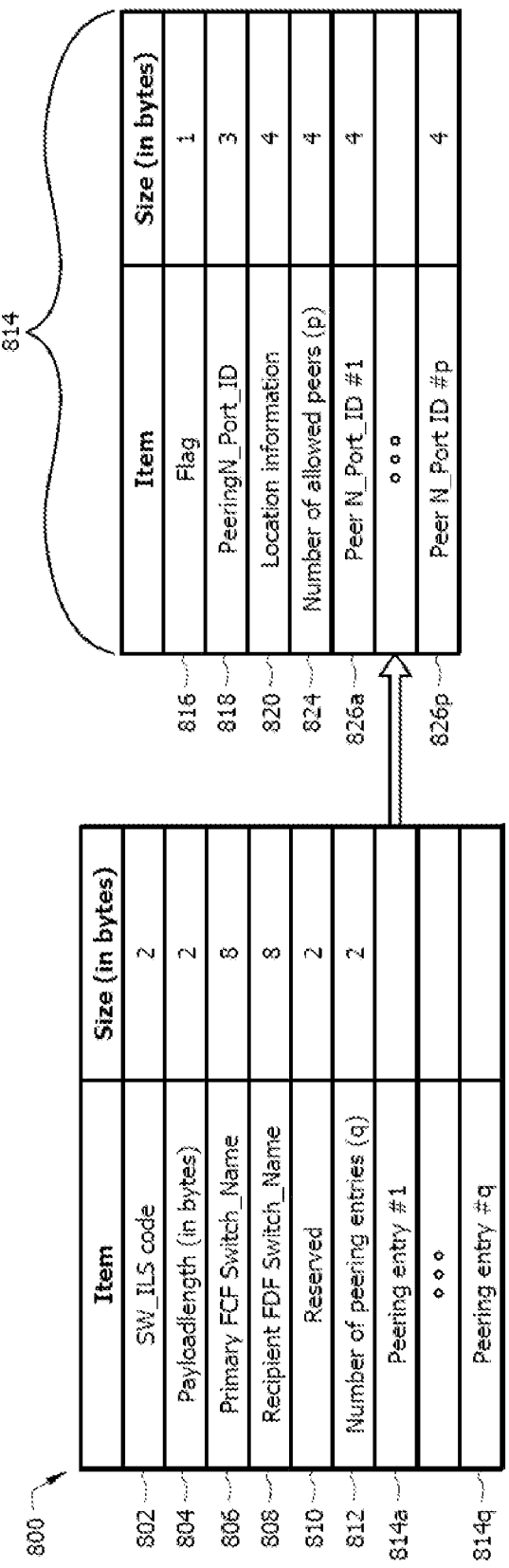
FIG. 8 is a table describing the elements and size of an embodiment of the payload of Zoning ACL Distribution (ZAD) Request SW_ILS.

FIG. 8 is a table describing the elements and size of an embodiment of the payload of ZAD Request SW_ILS 800. The payload of ZAD Request SW_ILS 800 may comprise a SW_ILS code 802, a payload length field 804, a Primary FCF Switch_Name field 806, a Recipient FDF Switch_Name field 808, a Reserved field 810, the number of peering entries field 812, and at least one peering entry field 814 (e.g. 814a-814q). The SW_ILS code 802 may be about two bytes long and may define the type of SW_ILS message encoded in the payload. The payload length field 804 may be about two bytes long, and may indicate the length of the payload of ZAD Request SW_ILS 800. The Primary FCF Switch_Name field 806 and the Recipient FDF Switch_Name field 808 may be about eight bytes long, and may be substantially similar to the Primary FCF Switch_Name field 704 and a Recipient FDF Switch_Name field 706 described in FIG. 7. The Reserved field 810 may be about two bytes long and may be substantially similar to the Reserved field 708 described in FIG. 7. The number of peering entries field 812 may about two bytes long and may indicate the total number of peering entries field 814 within the payload of ZAD Request SW_ILS 800.

Each peering entry field 814 may comprise a Flag field 816, Peering N_Port_ID field 818, a Location information field 820, the Number of allowed peers 822, and at least one Peer N_Port_ID field 824. The Flag field 816 may be about one byte long and may indicate if the peering N_Port_ID may be added (e.g. after fabric login) or deleted (e.g. after fabric logout) as a static entry from a MAC forwarding table. If the Flag field 816 is set to delete the peering N_Port_ID, the FRB may remove the corresponding static entry from its MAC forwarding table. The Peering N_Port_ID field 818 may be about three bytes long and may indicate the N_Port_ID that may be added or deleted from the network. An FFS may have assigned the N_Port_ID to the VN_Port of a ENode that sent the FIP FLOGI message request. The Location information field 820 may be about four bytes long, and may indicate the location (e.g. FRB Nickname) of the N_Port_ID that needs to be added or deleted within the network. The number of allowed peers field 822 may be about four bytes long and may be substantially similar to the number of allowed peers field 714 described in FIG. 7. The Peer N_Port_ID field 824 may be about four bytes long and may indicate the peers associated with the N_Port_ID indicated in Peering N_Port_ID field 818.

Figure 9:
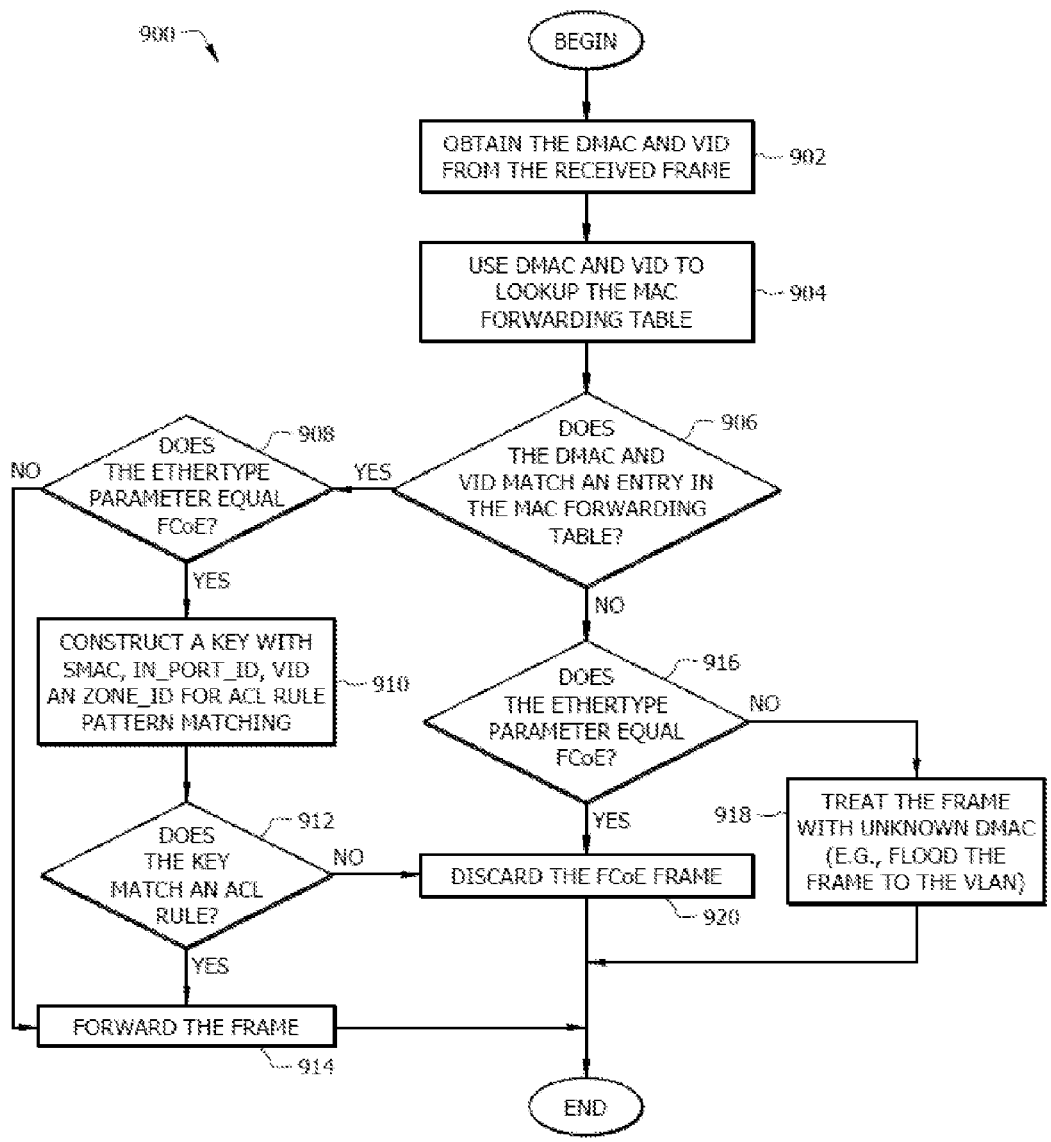
FIG. 9 is a flowchart of an embodiment of a method for an ingress FRB to forward data frames received from an FC/FCoE Node (ENode).

FIG. 9 is a flowchart of an embodiment of a method 900 for an ingress FRB to forward data frames received from an ENode. The ingress FRB may receive a data frame that comprises a DMAC equal to the destination VN_Port MAC address. The ingress FRB may subsequently forward the received data frame to another network node within the Ethernet network. The FRB may start to forward the data frames after performing the FLOGI and zone distribution enforcement.

Method 900 begins at block 902 and obtains the DMAC and VID from the received data frame. The DMAC in block 902 may reference the destination VN_Port of an ENode. Using FIG. 4 as an example, FRB 1 106 may receive a data frame that has a DMAC value of "MAP∥6.10.1" from ENode A 108. After obtaining the DMAC and VID, method 900 proceeds to block 904 to perform a lookup using the MAC forwarding table. Method 900 may use the DMAC and the VID as references to match entries within the MAC forwarding table. Method 900 may then move to block 906 to determine whether the DMAC and VID match entries within the MAC forwarding table. Using the MAC forwarding tables for FRB 1 106 as illustrated in FIG. 4, if the received data frame has a DMAC of "MAP∥6.10.1" and a VID of "10," then block 906 may determine the DMAC and VID values match the third entry shown in FIG. 4. If the MAC forwarding table has an entry that matches the DMAC and VID, then method 900 proceeds to block 908. However, if no matching entries exist, then method 900 proceeds to block 916.

At block 908, method 900 determines whether the data frame received has an EtherType equal to an FCoE frame encapsulation. When the data frame has an EtherType equal to an FCoE frame, the received data frame may be encapsulated as an FCoE frame. If the data frame is not encapsulated as an FCoE frame (e.g. TRILL frame), method 900 may continue to block 914 and forward the data frame. Alternatively, when the data frame is an FCoE encapsulated frame, method 900 proceeds to block 910.

At block 910, method 900 constructs a key using the SMAC and VID obtained from the data frame and the In_Port_ID and Zone_ID. The In_Port_ID may reference the port that received the incoming data frame, while the Zone_ID may be generated using the DMAC and VID. In FIG. 4, the Zone_ID for a data frame sent from ENode A 108 may have a Zone_ID of "X." After constructing the key, method 900 may use the key to perform a pattern search against existing ACL rules. Method 900 then moves to block 912 to determine whether the key matches an ACL rule. When a match is found, method 900 may proceed to block 914 and forward the data frame. When a match is not found, method 900 may move to block 920 and discard the FCoE frame. Using FIG. 4 as an example, the ACL rule in FRB 1 106 for N_Port_ID 3.8.1 (e.g. ENode A 108) may be set as follows: SMAC=MAP∥3.8.1, In_Port_ID=P11, VID=10, Zone_ID=X, permit. In this case, when FRB 1 106 receives an FCoE frame from ENode A 108, if the FCoE frame does not arrive at port P11, then the FRB 1 106 may drop the FCoE frame. Furthermore, when the FCoE frame has a DMAC outside Zone X, then the FRB 1 106 may also drop the FCoE frame. Conversely, when the FCoE frame matches the parameters within the ACL rule, FRB 1 106 may forward the FCoE frame within the Ethernet Network 110. The method 900 subsequently ends after forwarding the data frame or discarding the FCoE frame.

Returning back to block 916, method 900 determines whether the received frame is an encapsulated FCoE frame similar to block 908. When the frame is not an FCoE encapsulated frame, method 900 may move to block 918 and treat the frame with an unknown DMAC. At this point, method 900 may forward the frame by flooding the frame to other network nodes within the virtual network and then end. Block 918 may use flooding methods well known in the art for Ethernet networks that use link-state routing protocols. In the alternative, when method 900 determines at block 916 that the frame is encapsulated as an FCoE frame, method 900 may discard the FCoE frame and then end.

Figure 10:
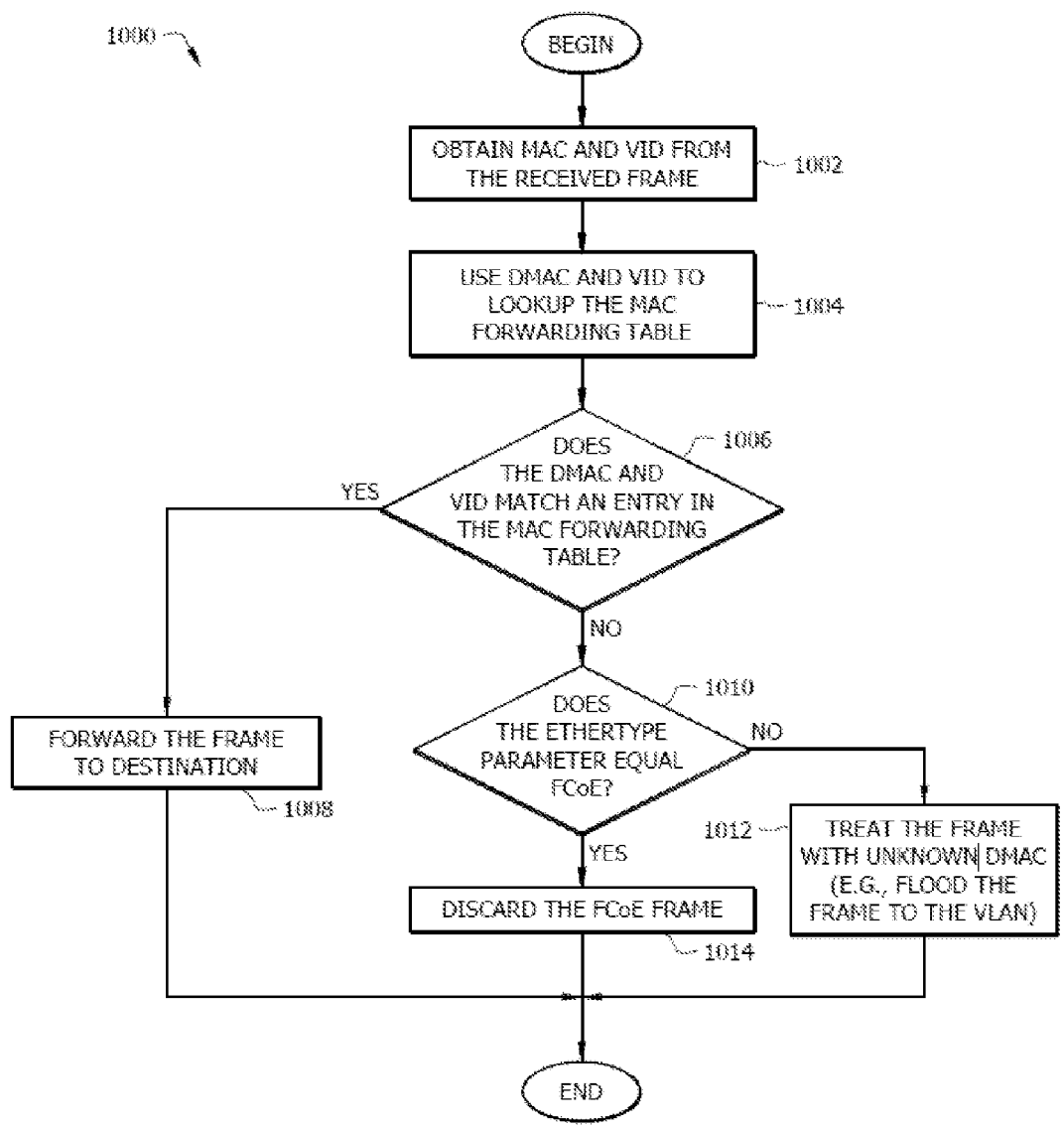
FIG. 10 is a flowchart of an embodiment of a method for an egress FRB to forward frames received from a network node within an Ethernet network.

FIG. 10 is a flowchart of an embodiment of a method 1000 for an egress FRB to forward frames received from a network node within an Ethernet network. An egress FRB may be an FRB that receives the frame from the network node and subsequently forwards the frame to an ENode or some other destination node. Method 1000 may forward the received frames as FCoE frames, except when FCoE frames include unknown DMACs. Block 1002, 1004, and 1006 in method 1000 are substantially similar to blocks 902, 904, and 906 in method 900, respectively. When the DMAC and VID matches a MAC forwarding table entry, method 1000 proceeds to block 1008 and forwards the frame to the destination (e.g. ENode). When the DMAC and VID do not match a MAC forwarding table entry, method 1000 may proceed to block 1010. Block 1010, 1012, and 1014 may be substantially similar to blocks 916, 918, and 920 in FIG. 9, respectively.

Figure 11:
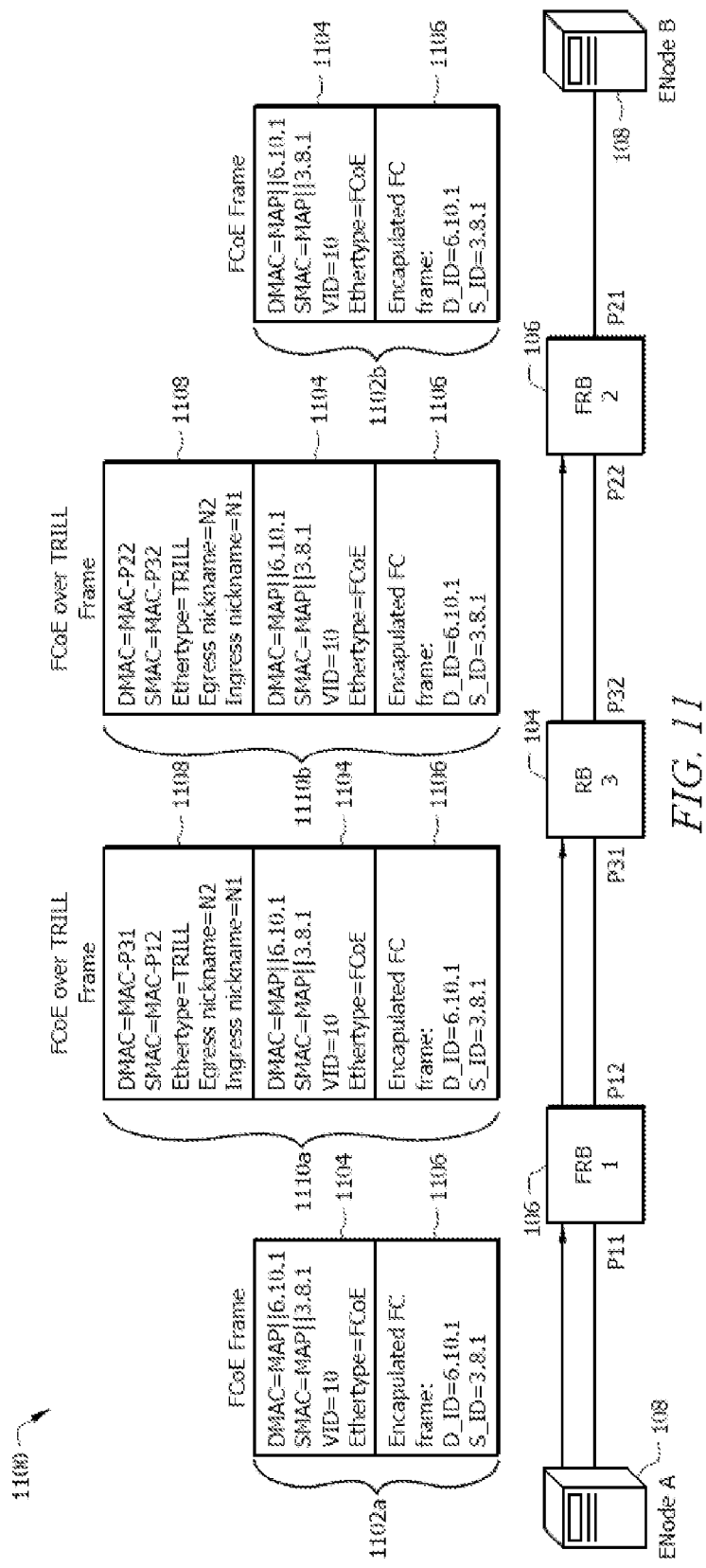
FIG. 11 is a schematic diagram of an embodiment of a unified data center network forwarding FCoE frames over a TRILL based Ethernet network.

FIG. 11 is a schematic diagram of an embodiment of a unified data center network 1100 forwarding FCoE frames over a TRILL based Ethernet network. FRB 1 106 may determine whether to forward the FCoE frame 1102*a* as FCoE over TRILL frame 1110*a* using method 900 described in FIG. 9. FRB 2 106 may determine whether to forward the FCoE frame 1102*b* to ENode B 108 using the method 1000 described in FIG. 10. The RBridge 3 104 may subsequently forward the FCoE over TRILL frame 1110*b* to FRB 2 106 using standard TRILL forwarding procedures well known in the art. In FIG. 11, the forwarding process may start when ENode A 108 encapsulates an FC encapsulation segment 1106 (e.g. FC frame) using an FCoE encapsulation segment 1104 to form FCoE frame 1102*a*. FRB 1 106 may receive the FCoE frame 1102*a* from ENode A 108, and subsequently encapsulate the FCoE frame 1102*a* using a TRILL encapsulation segment 1108 to form FCoE over TRILL frame 1110*a*. The FCoE over TRILL frame 1110*a* may be forwarded via the P12 port to RBridge 3 104. Afterwards, RBridge 3 104 may receive the FCoE over TRILL frame 1110*a* at the P31 port and forward the FCoE over TRILL frame 1110*b* to FRB 2 106 via the P32 port. The FRB 2 106 may receive the FCoE over TRILL frame 1110*b* at port P22 and may subsequently forward an FCoE frame 1102*b* to ENode B 108 via the P21 port.

The FCoE frames 1102*a* and *b* may comprise a FCoE encapsulation segment 1104 and a FC encapsulation segment 1106. The FC encapsulation segment 1106 may be a standard FC frame that comprises a D_ID and S_ID. As shown in FIG. 11, the D_ID references the destination N_Port_ID (e.g. a VN_Port in ENode B 108), while the S_ID references the source N_Port_ID (e.g. a VN_Port in ENode A 108). ENode A 108 may be configured to send FCoE frame 1102*a* with the DMAC in the FCoE encapsulation segment 1104 as the destination VN_Port MAC address of ENode B 108 (e.g. MAP∥6.10.1). The SMAC in FCoE frame 1102*a* may be the MAC address of the VN_Port that forwards the FCoE frame 1102*a* to the FRB 1 106. The VID and EtherType may be substantially similar to the VID and EtherType discussed in the N_Port_ID Allocation Request in FIG. 4. FIG. 11 illustrates that the DMAC, SMAC, VID, and EtherType parameters within FCoE frame 1102b matches the FCoE frame 1102a.

The FCoE frames over TRILL frame 1110a and b may comprise a FCoE encapsulation segment 1104, a FC encapsulation segment 1106, and a TRILL encapsulation segment 1108. As shown in FIG. 11, the TRILL encapsulation may not modify the data within the FCoE encapsulation segment 1104 and FC encapsulation segment 1106 encoded for the FCoE frame 1102a. The TRILL encapsulation segment 1108 may have DMAC equal to the next-hop MAC port address, while the SMAC corresponds to MAC port address forwarding the FCoE over TRILL frame 1110a and b. For example, for FCoE over TRILL frame 1110a the DMAC address in the TRILL encapsulation segment 1108 may have a DMAC address of "MAC-P31," which references the next-hop port, port P31 of RBridge 3 104. Similar to the N_Port_ID Allocation request frame 404 discussed in FIG. 4, the TRILL encapsulation segment 1108 may comprise an Ingress Nickname that may reference the FRB 106 that received the FCoE frame 1102a from the source ENode 108 (e.g. ENode A 108) and a Egress Nickname that may reference the FRB 106 that will forward the FCoE frame 1102b to the destination ENode 108 (e.g. ENode B 108). FRB 2 106 may forward an FCoE frame 1102b and not a FCoE over TRILL frame 1110a and b because the ENode B 108 may not be located within the TRILL based Ethernet network.

Figure 12:
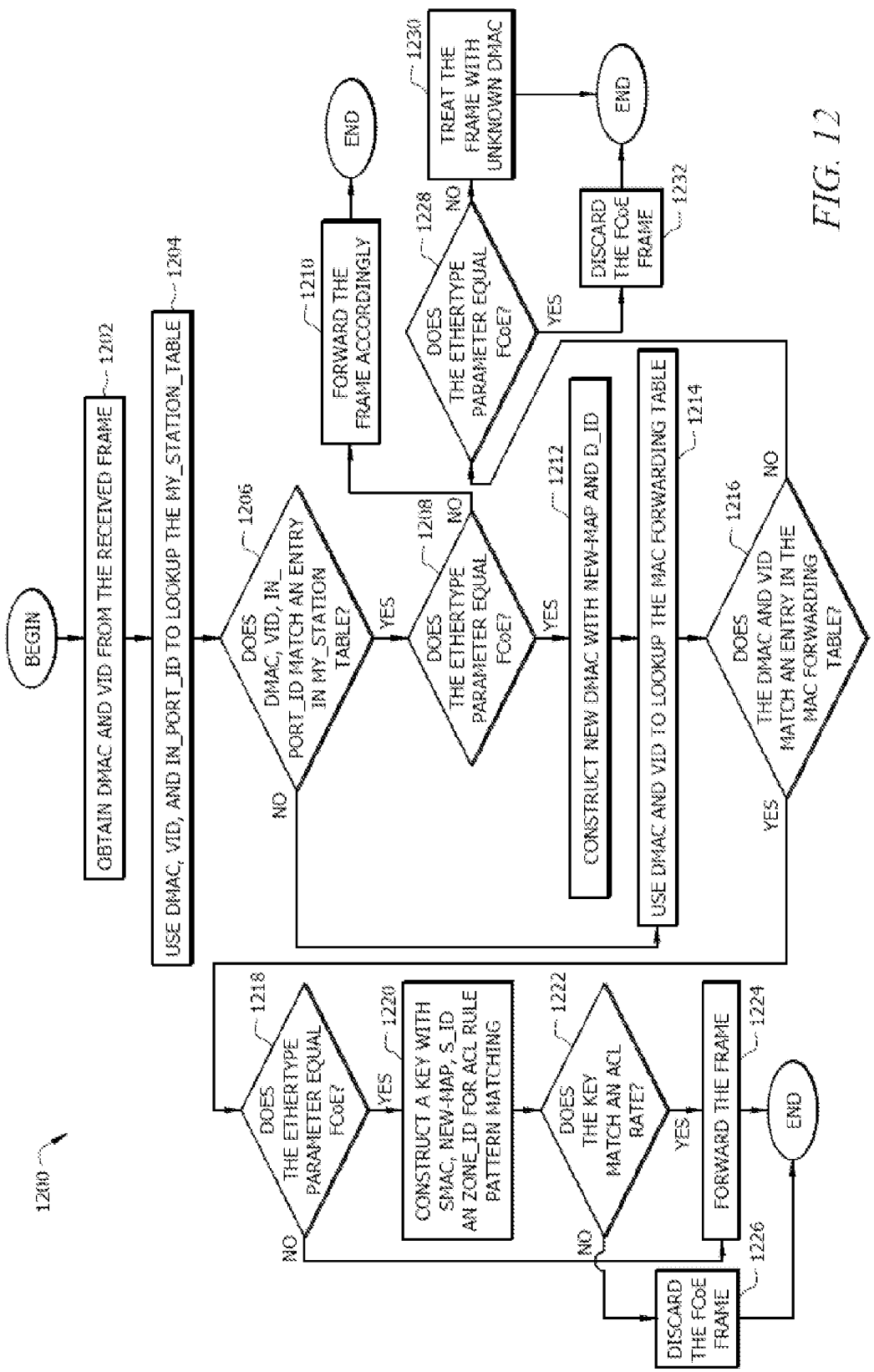
FIG. 12 is a flowchart of another embodiment of a method for an ingress FRB to forward frames received from an ENode.

FIG. 12 is a flowchart of another embodiment of a method for an ingress FRB to forward frames received from an ENode. Method 1200 may be implemented when the ingress FRB receives a frame with a DMAC equal to the next-hop FCF-MAC Port address. Method 1200 starts at block 1202 and obtains the DMAC and VID from the received frame. In contrast to block 902 from method 900, the receiving frame may have a DMAC value equal to the MAC Port address that received the frame and not the destination VN_Port MAC address. At this point, method 1200 may then proceed to block 1204 and may use the DMAC and VID obtained from block 202, and the In_Port_ID to construct a key to perform a lookup against the My_Station_Table. The My_Station_Table will be discussed in further detail below. Method 1200 may then move to block 1206 to determine whether the key matches an entry within the My_Station_Table. If the key matches an entry in the My_Station_Table, then method 1200 may continue to block 1208. A key may match an entry when method 1200 receives the frame on an expected port. However, if no entries match, then method 1200 may instead progress to block 1214.

Block 1208 may be substantially similar to block 916 as described in FIG. 9. When method 1200 determines that the frame is not an FCoE frame in block 1208, the method 1200 may continue to block 1210. At block 1210, the method 1200 may forward the frame using standard Ethernet forwarding procedures well known in the art and then ends. Alternatively, at block 1212, method 1200 may construct a new DMAC using a new-MAP and D_ID. Method 1200 may return the new-MAP value after the lookup process at block 1204. Method 1200 may then use the new-MAP value and D_ID to create a new DMAC. Method 1200 may then continue to block 1214 using the new DMAC. Blocks 1214, 1216, 1218, 1222, 1224, 1228, 1230, 1232 may be substantially similar to blocks 902, 903, 906, 908, 912, 914, 916, 918, and 920 as described in FIG. 9 respectively. Block 1220 may be similar to block 910 as described in FIG. 9 except that the key for the ACL entry search is based on the SMAC, new-MAP, S_ID, and Zone_ID. Using FIG. 4 as an example, the ACL rule in FRB 1 106 for N_Port_ID 3.8.1 may be SMAC=MAP∥3.8.1, MAP=new-MAP, S_ID=3.8.1, Zone_ID=X, permit.

Figure 13:
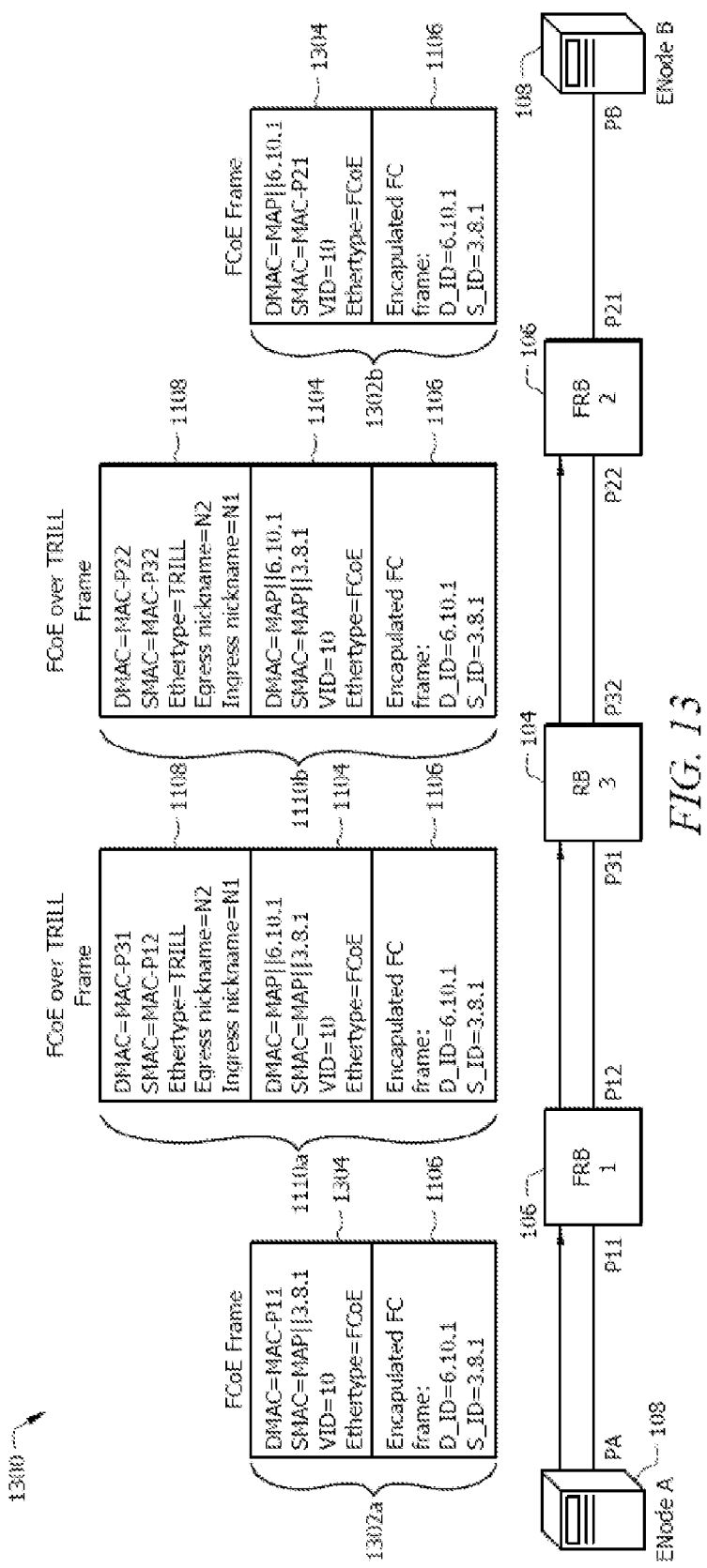
FIG. 13 is a schematic diagram of another embodiment of a unified data center network forwarding FCoE frames over a TRILL based Ethernet network.

FIG. 13 is a schematic diagram of another embodiment of a unified data center network 1300 forwarding FCoE frames over a TRILL based Ethernet network. Similar to FIG. 11, ENode A 108 sends an FCoE frame 1302a to FRB 1 106. FRB 1 106 encapsulates the FCoE frame using a TRILL encapsulation segment 1108 to form an FCoE over TRILL frame 1110a. The FCoE over TRILL frame 1110a is sent to RBridge 3 104. RBridge 3 104 modifies the TRILL encapsulation segment 1108 and forwards the FCoE over TRILL frame 1110b to FRB 2 106 without modifying the FCoE segment 1104 and 1106. Once FRB 2 106 receives the FCoE over TRILL Frame, FRB 2 106 removes the TRILL encapsulation segment 1108 and forwards FCoE frame 1302b to ENode B 108.

In this embodiment, ENode A 108 may send FCoE frames with DMAC equal to the next-hop FCF-MAC or FDF-MAC Port addresses instead of transmitting FCoE frames using the destination VN_Port MAC address as the DMAC. FIG. 13 illustrates that DMAC has a value of "MAC-P11" in the FCoE encapsulation segment 1304 instead of "MAP∥6.10.1" as shown in FIG. 11. The ingress FRB 1 106 may create a key using the DMAC and VID from the FCoE frame 1302a, and the In_Port_ID (e.g. P11) that received the FCoE frame 1302a. The key may then be used to perform a lookup on the My_Station_Table stored in FRB 1 106. The My_Station_Table may be used to determine whether the FCoE frame is expected on the FCF-MAC or FDF-MAC port. In FIG. 13, when the key matches an entry within FRB 1's 106 My_Station_Table, the FRB 1 106 may expect the FCoE frame 1302a on port P11. The lookup on the My_Station_Table may return a new-MAP value. The FRB 1 106 may subsequently form a new DMAC based on the new-MAP value and D_ID obtained from the FC encapsulation segment 1106. The new DMAC and the VID from the FCoE frame 1302a may be used to perform a MAC forwarding table lookup. Afterwards, FRB 1 106 may to determine whether to forward the FCoE frame using the method 1200 as described in FIG. 12.

The egress FRB 2 106 may forward the FCoE frame 1302b using a method substantially similar to method 1000 as described in FIG. 10. However, the SMAC is replaced by the egress port FCF-MAC or FDF-MAC address. FIG. 13 depicts that the SMAC has a value of "MAC-P21" rather than the "MAP∥3.8.1" in FCoE over TRILL frames 1110a and b as shown in FIG. 11. Modifying the SMAC may be indicated by the return value of the MAC forwarding table lookup or per port configuration for FCoE frames. Other methods well known in the art may be used to modify the SMAC for the FCoE frame 1302b.

Figure 14:
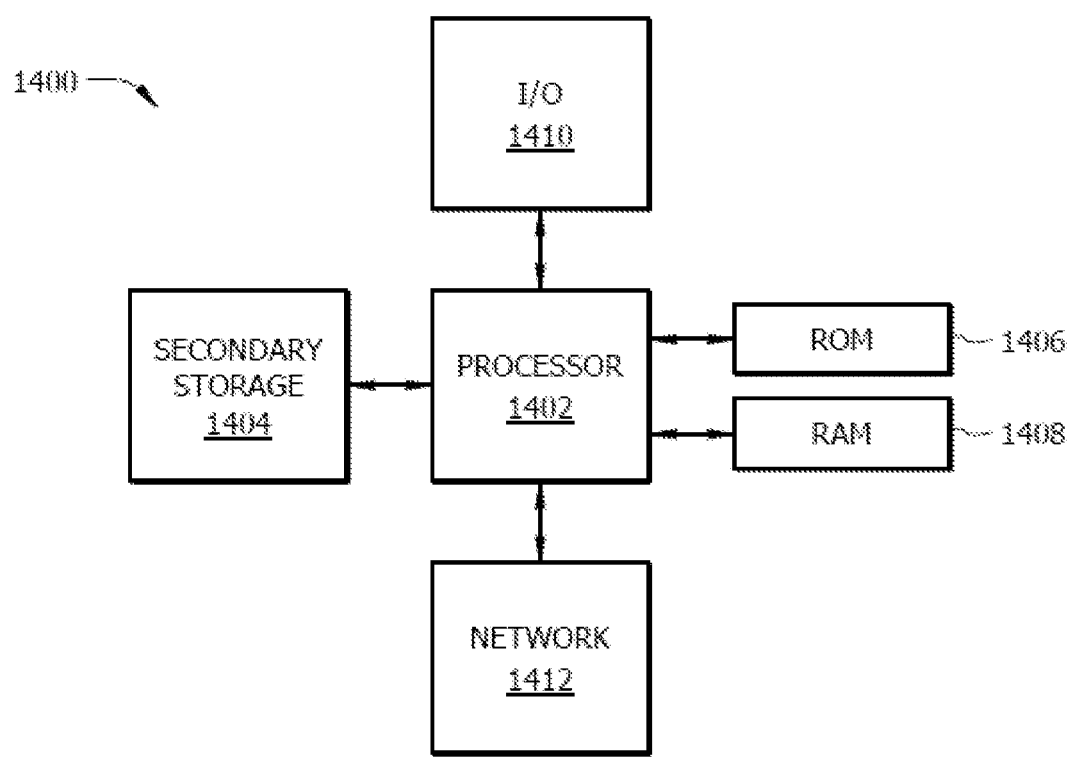
FIG. 14 is a schematic diagram of one embodiment of a general-purpose computer system suitable for implementing the several embodiments of the disclosure.

FIG. 14 illustrates a typical, general-purpose network component 1400 that may correspond to or may be part of the nodes described herein, such as a server, a switch, a router, or any other network nodes. The network component 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The general-purpose network component 1400 may also comprise, at the processor 1402 and or any of the other components of the general-purpose network component 1400.

The processor 1402 may be implemented as one or more general-purpose CPU chips, or may be part of one or more application specific integrated circuits (ASICs) and/or digital signal processors (DSPs). The processor 1402 may comprise a central processor unit or CPU. The processor 1402 may be implemented as one or more CPU chips. The secondary storage 1404 is typically comprised of one or more disk drives or tape drives and is used for non-volatile storage of data and as an over-flow data storage device if RAM 1408 is not large enough to hold all working data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for forwarding a Fiber Channel over Ethernet (FCoE) data frame into an Ethernet network comprising:
   a processor configured to:
      receive a data frame on a input port;
      obtain a first destination address and a virtual local area network identifier (VID) from the data frame received;
      determine whether the first destination address and the VID matches an entry within a forwarding table;
      construct a key from the first destination address and the VID when the first destination address and the VID matches the entry and the data frame is a FCoE frame; and
      subsequently forward the data frame as an outgoing data frame via an output port when the key matches a rule that permits forwarding the data frame;
   wherein the data frame is an FCoE frame that comprises a destination address that references a virtual N_Port (VN_Port), and
   wherein a location of the VN_Port is indicated by a FCoE routing bridge nickname.

2. The apparatus of claim 1, wherein the processor is further configured to flood the data frame when the first destination address and the VID do not match the entry and the data frame is not the FCoE frame.

3. The apparatus of claim 1, wherein the processor is further configured to discard the data frame when the destination address and the VID do not match the entry and the data frame is the FCoE frame.

4. The apparatus of claim 1, wherein the VN_Port has been assigned a N_Port_identifier (N_Port_ID), and wherein the destination address has a value of a Media Access Prefix concatenated with the N_Port_ID.

5. The apparatus of claim 1, wherein the processor is further configured to receive a fabric login message that comprises a location descriptor that provides the location information of the VN_Port.

6. The apparatus of claim 1, wherein the outgoing data frame is encapsulated as a Transparent Interconnection of Lots of Links (TRILL) frame.

7. The apparatus of claim 6, wherein the outgoing data frame comprises an ingress nickname and an egress nickname, wherein the ingress nickname specifies the location from which the data frame originated, and wherein the egress nickname specifies the location to which the data frame needs to be forwarded.

8. The apparatus of claim 1, wherein the processor is further configured to associate the input port with an input port identifier (ID) that identifies the input port, wherein the data frame comprises a source address and the VID, and wherein the key comprises the source address, the VID, the input port ID, and a Zone ID that indicates a corresponding zone of where the data frame originated from.

9. The apparatus of claim 1, wherein the data frame comprises a source address, a second destination address, and the VID, and wherein the processor is further configured to associate the input port with an input port identifier (ID) that identifies the input port and obtain the first destination address using the second destination address, the VID, and the input port ID.

10. The apparatus of claim 1, wherein the destination address is a Media Access Control (MAC) address that has a value of Media Address Prefix (MAP) concatenated with a N_Port_identifier (N_Port_ID) of a virtual N_Port (VN_Port).

11. An apparatus for forwarding an Ethernet data frame from an Ethernet network to a Fiber Channel over Ethernet (FCoE) node comprising:
a data path module comprising a FCoE enabled port and an Ethernet enabled port; and
a FCoE control and management module coupled to the data path module;
wherein the Ethernet enabled port receives the Ethernet data frame,
wherein the Ethernet data frame is forwarded via the FCoE enabled port,
wherein the FCoE control and management module comprises a Media Access Control (MAC) forwarding table used to forward the Ethernet data frame, and
wherein the FCoE control and management module is configured to:
obtain a first destination Media Access Control (DMAC) and a virtual local area network identifier (VID) from the Ethernet data frame;
determine, using a key constructed from the first DMAC and the VID, whether the first DMAC and the VID matches an entry in the MAC forwarding table; and
subsequently forward the Ethernet data frame to the FCoE enabled port when the key constructed using the first DMAC and the VID matches the entry,
wherein a nickname of the apparatus indicates a location of a virtual port of the FCoE node.

12. The apparatus of claim 11, wherein the Ethernet data frame further comprises a Transparent Interconnection of Lots of Links (TRILL) encapsulation, and wherein the TRILL encapsulation is removed when the Ethernet data frame is forwarded via the FCoE enabled port.

13. The apparatus of claim 11, wherein the FCoE control and management module is further configured to determine whether the Ethernet data frame comprises a FCoE encapsulation and discard the Ethernet data frame when the first DMAC and the VID do not match the entry and the Ethernet data frame comprises the FCoE encapsulation.

14. The apparatus of claim 13, wherein the Ethernet data frame is treated as a flood frame when the first DMAC and the VID do not match the entry in the MAC forwarding table and the Ethernet data frame does not comprise the FCoE encapsulation, and wherein the FCoE encapsulation comprises a source MAC (SMAC), and wherein the SMAC references a MAC address of a source of the Ethernet data frame.

15. The apparatus of claim 13, wherein the FCoE encapsulation comprises a source MAC (SMAC), and wherein the SMAC references a MAC address of the FCoE enabled port.

16. A method for forwarding Fiber Channel over Ethernet (FCoE) frames over a Transparent Interconnection of Lots of Links (TRILL) based network, the method comprising:
associating a virtual_N Port (VN_Port) of a fiber channel/FCoE node (eNode) with a FCoE Routing Bridges (FRB) nickname, wherein the FRB nickname indicates the location of the VN_Port;
receiving, from the eNode, an incoming data frame that comprises a first destination Media Access Control (DMAC) and a virtual local area network identifier (VID);
performing a table lookup using a second DMAC and the VID to determine whether the second DMAC and the VID match an entry within a MAC forwarding table;
determining whether the incoming data frame comprises a FCoE encapsulation data segment;
determining whether an Access Control List (ACL) rule permits forwarding the incoming data frame; and
subsequently forwarding the data frame when the ACL rule permits forwarding the incoming data frame, the second DMAC and the VID matches the entry, and the incoming data frame comprises a FCoE encapsulation data segment.

17. The method of claim 16, wherein the first DMAC and the second DMAC are the same, wherein a key is constructed to determine whether an ACL rule permits forwarding the incoming data frame, and wherein the key does not match an ACL rule, the incoming frame is discarded.

18. The method of claim 16, wherein the incoming data frame further comprises a destination identifier (D_ID) within a Fiber Channel (FC) encapsulation, wherein the first DMAC and the second DMAC are different, wherein the incoming frame is received on an input port, wherein the first DMAC, the VID, and an input port identifier (ID) associated with the input port are used to generate a new Media Address Prefix (MAP), and wherein the second DMAC is equal to concatenating the new-MAP and the D_ID.

19. The method of claim 17, wherein the incoming frame is forwarded when the first DMAC, the VID, and an input port identifier (ID) do not generate a new Media Address Prefix (MAP) and the incoming data frame does not comprise the FCoE encapsulation data segment.

* * * * *